(12) United States Patent
Zhao et al.

(10) Patent No.: US 12,696,212 B2
(45) Date of Patent: Jul. 28, 2026

(54) UPLINK SYNCHRONIZATION METHOD AND RELATED DEVICE

(71) Applicant: Huawei Technologies Co., Ltd., Shenzhen (CN)

(72) Inventors: Chen Zhao, Shenzhen (CN); Zhou Wang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 412 days.

(21) Appl. No.: 18/552,782

(22) PCT Filed: Mar. 28, 2022

(86) PCT No.: PCT/CN2022/083286
§ 371 (c)(1),
(2) Date: Sep. 27, 2023

(87) PCT Pub. No.: WO2022/206657
PCT Pub. Date: Oct. 6, 2022

(65) Prior Publication Data
US 2024/0179659 A1      May 30, 2024

(30) Foreign Application Priority Data

Mar. 31, 2021     (CN) .......................... 202110352853.1

(51) Int. Cl.
H04W 56/00      (2009.01)
H04W 74/0833      (2024.01)
H04W 80/02      (2009.01)
(52) U.S. Cl.
CPC ..... H04W 56/0045 (2013.01); H04W 56/005 (2013.01); H04W 74/0833 (2013.01); H04W 80/02 (2013.01)

(58) Field of Classification Search
None
See application file for complete search history.

(56) References Cited

U.S. PATENT DOCUMENTS 9,844,051 B2 *   12/2017   Blankenship ..... H04W 56/0005
9,894,627 B2 *   2/2018   Choi ................. H04W 56/0015
(Continued)

FOREIGN PATENT DOCUMENTS

CN      109275185 A      1/2019
CN      111356238 A      6/2020
(Continued)

OTHER PUBLICATIONS

3rd Generation Partnership Project; Technical Specification Group Radio Access Network; Study on channel model for frequencies from 0.5 to 100 GHz (Release 16), 3GPP TR 38.901 V16.1.0, (Dec. 2019), total 101 pages.

*Primary Examiner* — Faiyazkhan Ghafoerkhan
(74) *Attorney, Agent, or Firm* — Conley Rose, P.C.

(57) ABSTRACT

In an uplink synchronization method, a network device may send a timing advance (TA) of a normal uplink (NUL) and a TA of a supplementary uplink (SUL) to a terminal device. The terminal device may adjust, based on the TA of the NUL, time for sending uplink data through the NUL, and adjust, based on the TA of the SUL, time for sending data through the SUL. The terminal device may separately adjust the time for sending uplink data through the NUL and the time for sending uplink data through the SUL.

20 Claims, 12 Drawing Sheets

(56) References Cited

U.S. PATENT DOCUMENTS

| 10,075,929 | B2 * | 9/2018 | Yi ........................ H04W 56/009 |
| 10,104,658 | B2 * | 10/2018 | Guo ....................... H04L 5/0051 |
| 10,117,273 | B2 * | 10/2018 | Lee ....................... H04B 7/2612 |
| 10,257,875 | B2 * | 4/2019 | Nagasaka ......... H04W 74/0833 |
| 10,334,652 | B2 * | 6/2019 | Rahman ................ H04W 76/15 |
| 10,383,110 | B2 * | 8/2019 | Blankenship ....... H04W 72/044 |
| 10,555,344 | B2 * | 2/2020 | Lee ....................... H04B 7/2612 |
| 10,631,355 | B2 * | 4/2020 | Nagasaka ............. H04W 76/15 |
| 10,681,738 | B2 * | 6/2020 | Babaei ............. H04W 74/0833 |
| 10,798,744 | B2 * | 10/2020 | Lee ....................... H04B 7/2612 |
| 11,129,206 | B2 * | 9/2021 | Lee ....................... H04B 7/2612 |
| 11,140,695 | B1 * | 10/2021 | Eyuboglu ........... H04W 72/535 |
| 11,153,911 | B2 * | 10/2021 | Lee ....................... H04B 7/2612 |
| 11,206,549 | B1 * | 12/2021 | Eyuboglu ........... H04W 36/085 |
| 11,271,699 | B1 * | 3/2022 | Eyuboglu ........... H04J 11/0073 |
| 11,375,527 | B1 * | 6/2022 | Eyuboglu .......... H04B 7/15528 |
| 11,503,648 | B2 * | 11/2022 | Babaei ............. H04W 74/0833 |
| 11,510,239 | B2 * | 11/2022 | Cirik .................. H04W 74/002 |
| 11,838,151 | B1 * | 12/2023 | Jones ................. H04L 25/0224 |
| 11,856,613 | B2 * | 12/2023 | Lee ....................... H04B 7/2612 |
| 11,979,350 | B1 * | 5/2024 | Eyuboglu ........... H04J 11/0073 |
| 12,010,735 | B2 * | 6/2024 | Da Silva ........... H04W 74/0866 |
| 12,349,187 | B2 * | 7/2025 | Cirik .................. H04W 74/002 |
| 2015/0036666 | A1 * | 2/2015 | Blankenship ..... H04W 56/0005 |
| | | | 370/336 |
| 2015/0230134 | A1 * | 8/2015 | Chiba .................. H04L 5/0098 |
| | | | 370/331 |
| 2016/0021648 | A1 * | 1/2016 | Blankenship ....... H04W 72/044 |
| | | | 370/336 |
| 2016/0100374 | A1 * | 4/2016 | Choi ..................... H04W 36/04 |
| | | | 370/331 |
| 2016/0192304 | A1 * | 6/2016 | Yi ..................... H04W 52/0206 |
| | | | 370/328 |
| 2016/0212770 | A1 * | 7/2016 | Lee ....................... H04B 7/2612 |
| 2016/0227581 | A1 * | 8/2016 | Lee ....................... H04B 7/2612 |
| 2016/0366687 | A1 * | 12/2016 | Guo ................. H04W 72/0446 |
| 2017/0366313 | A1 * | 12/2017 | Rahman ............... H04W 76/15 |
| 2018/0020439 | A1 * | 1/2018 | Blankenship ..... H04W 56/0045 |
| 2018/0054846 | A1 * | 2/2018 | Nagasaka ............. H04W 74/08 |
| 2018/0176905 | A1 * | 6/2018 | Li .......................... H04W 52/14 |
| 2018/0176961 | A1 * | 6/2018 | Babaei ............. H04W 74/0833 |
| 2018/0310210 | A1 * | 10/2018 | Yi ...................... H04W 36/0072 |
| 2019/0090262 | A1 * | 3/2019 | Yan ..................... H04W 72/23 |
| 2019/0098669 | A1 * | 3/2019 | Lee ....................... H04B 7/2612 |
| 2019/0109663 | A1 * | 4/2019 | Kusano ................ H04W 74/02 |
| 2019/0208560 | A1 * | 7/2019 | Nagasaka ......... H04W 74/0833 |
| 2019/0313463 | A1 * | 10/2019 | Lee ....................... H04B 7/2612 |
| 2020/0112999 | A1 * | 4/2020 | Lee ....................... H04B 7/2612 |
| 2020/0296772 | A1 * | 9/2020 | Babaei ............. H04W 74/0833 |
| 2021/0051710 | A1 * | 2/2021 | Cirik .................. H04W 74/002 |
| 2021/0058946 | A1 * | 2/2021 | Zhou ............... H04W 72/0446 |
| 2021/0392695 | A1 * | 12/2021 | Lee ....................... H04B 7/2612 |
| 2022/0053442 | A1 * | 2/2022 | Luo .................. H04W 56/0045 |
| 2023/0037661 | A1 * | 2/2023 | Cirik .................. H04W 74/002 |
| 2024/0179659 | A1 * | 5/2024 | Zhao ..................... H04W 76/15 |
| 2025/0380296 | A1 * | 12/2025 | Cirik .................. H04W 74/002 |

FOREIGN PATENT DOCUMENTS

| CN | 112020155 A | 12/2020 |
| WO | 2019192900 A1 | 10/2019 |

* cited by examiner

| Carrier 1 | NDL (UE1 Cell1) | NDL (UE1 Cell1) | NDL (UE1 Cell1) | NDL (UE1 Cell1) | NUL (UE1 Cell1) |
|---|---|---|---|---|---|
| Carrier 2 | SUL (UE1 Cell1) | SUL (UE1 Cell1) | SUL (UE1 Cell1) | SUL (UE1 Cell1) | |

| | |
|---|---|
| R | TAC | oct 0 |
| TAC | UL Grant | oct 1 |
| UL Grant | oct 2 |
| UL Grant | oct 3 |
| UL Grant | oct 4 |
| Temporary C-RNTI | oct 5 |
| Temporary C-RNTI | oct 6 |

| | |
|---|---|
| R | TAC 1 | oct 0 |
| TAC 1 | TAC 2 | oct 1 |
| TAC 2 | UL Grant | oct 2 |
| UL Grant | oct 3 |
| UL Grant | oct 4 |
| UL Grant | oct 5 |
| Temporary C-RNTI | oct 6 |
| Temporary C-RNTI | oct 7 |

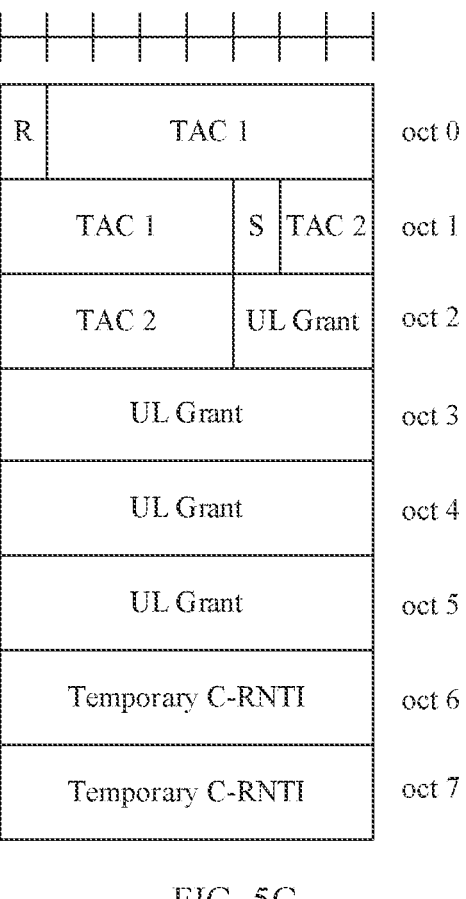
FIG. 5C
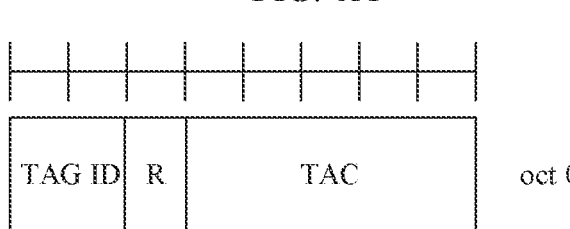
FIG. 6A
FIG. 6B

UPLINK SYNCHRONIZATION METHOD AND RELATED DEVICE

CROSS-REFERENCE TO RELATED APPLICATIONS

This is a National Stage of International Patent Application No. PCT/CN2022/083286 filed on Mar. 28, 2022, which claims priority to Chinese Patent Application No. 202110352853.1 filed on Mar. 31, 2021, both of which are hereby incorporated by reference in their entireties.

TECHNICAL FIELD

This application relates to the field of communication technologies, and in particular, to an uplink synchronization method and a related device.

BACKGROUND

A supplementary uplink (Supplementary Uplink, SUL) is introduced in a new radio (new radio, NR) protocol of the 3rd generation partnership project (3rd Generation Partnership Project, 3GPP). The SUL is mainly used to improve a coverage area of an uplink carrier, and can compensate for a defect that a coverage area of an uplink carrier of a normal uplink (Normal Uplink, NUL) is less than a coverage area of a normal downlink (Normal Downlink, NDL).

When a terminal device sends uplink data, an uplink data transmission delay is caused due to a reason such as a distance. Therefore, to ensure time synchronization of an uplink data receiver (for example, a base station), the terminal device needs to calculate a timing advance (Timing Advance, TA) of an uplink to send the uplink data in advance.

Currently, in a scenario in which base stations corresponding to the SUL and the NUL are in non-co-site deployment, how to maintain a TA of the SUL to improve transmission performance of the SUL needs to be further studied.

SUMMARY

Embodiments of this application provide an uplink synchronization method and a related device. A terminal device may separately adjust timing advances TAs of a normal uplink and a supplementary uplink, to ensure transmission performance of the supplementary uplink in a non-co-site deployment scenario.

According to a first aspect, an embodiment of this application provides an uplink synchronization method, applied to a terminal device. The method includes: The terminal device sends first uplink data to a first network device through a normal uplink NUL, and sends second uplink data to a second network device through a supplementary uplink SUL. The terminal device receives a first timing advance and a second timing advance that are sent by the first network device, where the first timing advance is generated by the first network device based on the first uplink data, and the second timing advance is generated by the second network device based on the second uplink data. The terminal device adjusts, based on the first timing advance, time for sending uplink data through the NUL, and adjusts, based on the second timing advance, time for sending uplink data through the SUL.

When this embodiment of this application is implemented, the first network device may send the TA of the NUL and the TA of the SUL to the terminal device. The terminal device may adjust, based on the TA of the NUL, the time for sending uplink data through the NUL, and adjust, based on the TA of the SUL, the time for sending the data through the SUL. In other words, the terminal device may separately adjust the time for sending uplink data through the NUL and the time for sending uplink data through the SUL, to optimize transmission performance of the SUL, and improve user experience.

In an implementation, that the terminal device receives a first timing advance and a second timing advance that are sent by the first network device specifically includes: The terminal device receives first downlink signaling, where the first downlink signaling carries the first timing advance and the second timing advance; or the terminal device separately receives second downlink signaling of the NUL and third downlink signaling of the SUL, where the second downlink signaling carries the first timing advance, and the third downlink signaling carries the second timing advance.

In an implementation, the first uplink data includes a first random access preamble of the NUL, and the second uplink data includes a second random access preamble of the SUL. The first downlink signaling includes first random access response signaling, the second downlink signaling includes second random access response signaling of the NUL, and the third downlink signaling includes third random access response signaling of the SUL.

In an implementation, the first downlink signaling includes a first media access control layer control element MAC CE, the second downlink signaling includes a second MAC CE, and the third downlink signaling includes a third MAC CE.

In an implementation, before that the terminal device sends first uplink data to a first network device through a normal uplink NUL, and sends second uplink data to a second network device through a supplementary uplink SUL, the method further includes: The terminal device receives first system information and second system information that are broadcast by the first network device, where the second system information is obtained by the first network device from the second network device. The terminal device generates the first random access preamble based on the first system information, and the terminal device generates the second random access preamble based on the second system information.

In an implementation, that the terminal device generates the first random access preamble based on the first system information, and the terminal device generates the second random access preamble based on the second system information specifically includes: After the terminal device receives identification information that is broadcast by the first network device, the terminal device determines to generate the first random access preamble based on the first system information, and generate the second random access preamble based on the second system information. The identification information is at least one of a first identifier and a second identifier, the first identifier indicates that the first network device and the second network device are in non-co-site deployment, and the second identifier indicates that a timing advance TA of the NUL and a timing advance TA of the SUL are independently maintained.

In an implementation, that the terminal device sends first uplink data to a first network device through a normal uplink NUL, and sends second uplink data to a second network device through a supplementary uplink SUL specifically includes: The terminal device sends the first random access preamble to the first network device through the NUL. The terminal device receives a physical downlink control channel order sent by the first network device. The terminal device sends the second random access preamble to the second network device based on the physical downlink control channel order through the SUL.

In an implementation, that the terminal device sends first uplink data to a first network device through a normal uplink NUL, and sends second uplink data to a second network device through a supplementary uplink SUL specifically includes: The terminal device sends the second random access preamble to the second network device through the SUL. The terminal device receives a physical downlink control channel order sent by the first network device, where the physical downlink control channel order is indicated by the second network device to be delivered by the first network device. The terminal device sends the first random access preamble to the first network device based on the physical downlink control channel order through the NUL.

In an implementation, the first system information is system information block SIB information of the NUL, and the second system information is SIB information of the SUL.

According to a second aspect, an embodiment of this application provides an uplink synchronization method, applied to a first network device. The method includes: The first network device receives first uplink data sent by a terminal device through an NUL. The first network device calculates a first timing advance based on the first uplink data. The first network device sends the first timing advance and a second timing advance to the terminal device, where the second timing advance is sent by a second network device, the second timing advance is generated by the second network device based on second uplink data sent by the terminal device through an SUL, the first timing advance is used by the terminal device to adjust time for sending uplink data through the NUL, and the second timing advance is used by the terminal device to adjust time for sending uplink data through the SUL.

In an implementation, that the first network device sends the first timing advance and a second timing advance to the terminal device specifically includes: The first network device sends first downlink signaling to the terminal device, where the first downlink signaling carries the first timing advance and the second timing advance; or the first network device separately sends second downlink signaling of the NUL and third downlink signaling of the SUL to the terminal device, where the second downlink signaling carries the first timing advance, and the third downlink signaling carries the second timing advance.

In an implementation, the first uplink data includes a first random access preamble of the NUL, and the second uplink data includes a second random access preamble of the SUL. The first downlink signaling includes first random access response signaling, the second downlink signaling includes second random access response signaling of the NUL, and the third downlink signaling includes third random access response signaling of the SUL.

In an implementation, the first downlink signaling includes a first media access control layer control element MAC CE, the second downlink signaling includes a second MAC CE, and the third downlink signaling includes a third MAC CE.

In an implementation, before that the first network device receives first uplink data sent by a terminal device through an NUL, the method further includes: The first network device sends a first system message and a second system message to the terminal device, where the first system message is used by the terminal device to generate the first random access preamble, the second system message is used by the terminal device to generate the second random access preamble, and the second system message is obtained by the first network device from the second network device.

In an implementation, before that the first network device receives first uplink data sent by a terminal device through an NUL, the method further includes: The first network device sends identification information to the terminal device. The identification information is at least one of a first identifier and a second identifier, the first identifier indicates that the first network device and the second network device are in non-co-site deployment, and the second identifier indicates that a timing advance TA of the NUL and a timing advance TA of the SUL are independently maintained. The first random access preamble is generated by the terminal device based on the first system message after the terminal device receives the identification information sent by the first network device. The first random access preamble is generated by the terminal device based on the first system message after the terminal device receives the identification information sent by the first network device.

In an implementation, after that the first network device receives first uplink data sent by a terminal device through an NUL, the method further includes: The first network device sends a physical downlink control channel order to the terminal device, where the physical downlink control channel order indicates the terminal device to send the second random access preamble to the second network device through the SUL.

In an implementation, before that the first network device receives first uplink data sent by a terminal device through an NUL, the method further includes: The first network device receives an indication message sent by the second network device. The first network device sends a physical downlink control channel order to the terminal device based on the indication message, where the physical downlink control channel order indicates the terminal device to send the first random access preamble to the first network device through the NUL.

In an implementation, before that the first network device sends the first timing advance and a second timing advance to the terminal device, the method further includes: The first network device sends a timing advance query request to the second network device, where the request indicates the second network device to send the second timing advance to the first network device. The first network device receives the second timing advance sent by the second network device; or the first network device receives the second timing advance periodically sent by the second network device.

In an implementation, the first system information is system information block SIB information of the NUL, and the second system information is SIB information of the SUL.

According to a third aspect, an embodiment of this application provides an uplink synchronization method, applied to a second network device. The method includes: The second network device receives second uplink data sent by a terminal device through an SUL. The second network device calculates a second timing advance based on the second uplink data. The second network device sends the second timing advance to a first network device, where the second timing advance is used by the terminal device to adjust time for sending uplink data through the SUL, the second timing advance is sent by the first network device to the terminal device through an NUL, and a first timing advance of the NUL is calculated based on first uplink data sent by the terminal device to the first network device.

In an implementation, the first timing advance and the second timing advance are sent by the first network device to the terminal device by using first downlink signaling; or the first timing advance is sent by the first network device to the terminal device by using second downlink signaling, and the second timing advance is sent by the first network device to the terminal device by using third downlink signaling.

In an implementation, the first uplink data includes a first random access preamble of the NUL, and the second uplink data includes a second random access preamble of the SUL. The first downlink signaling includes first random access response signaling, the second downlink signaling includes second random access response signaling of the NUL, and the third downlink signaling includes third random access response signaling of the SUL.

In an implementation, the first downlink signaling includes a first media access control layer control element MAC CE, the second downlink signaling includes a second MAC CE, and the third downlink signaling includes a third MAC CE.

In an implementation, before that the second network device receives second uplink data sent by a terminal device through an SUL, the method further includes: The second network device sends a second system message to the first network device, where the second system message is used by the terminal device to generate the second random access preamble, and the second system message is sent by the first network device to the terminal device.

In an implementation, the second random access preamble is sent by the terminal device after the terminal device receives identification information that is broadcast by the first network device, the identification information is at least one of a first identifier and a second identifier, the first identifier indicates that the first network device and the second network device are in non-co-site deployment, and the second identifier indicates that a timing advance TA of the NUL and a timing advance TA of the SUL are independently maintained.

In an implementation, the second random access preamble is indicated, after NUL uplink access by using a physical downlink control channel order, by the first network device to be sent by the terminal device.

In an implementation, after that the second network device sends the second timing advance to a first network device, the method further includes: The second network device sends an indication message to the first network device, where the indication message indicates the first network device to send a physical downlink control channel order to the terminal device, and the physical downlink control channel order indicates the terminal device to send the first random access preamble to the first network device through the NUL.

In an implementation, before that the second network device sends the second timing advance to a first network device, the method further includes: The second network device receives a timing advance query request sent by the first network device, where the request indicates the second network device to send the second timing advance to the first network device.

In an implementation, that the second network device sends the second timing advance to a first network device specifically includes: The second network device periodically sends the second timing advance to the first network device.

In an implementation, the second system information is SIB information of the SUL.

According to a fourth aspect, an embodiment of this application provides a terminal device, including one or more processors and one or more memories, where the one or more memories are coupled to the one or more processors, the one or more memories are configured to store computer program code, the computer program code includes computer instructions, and when the one or more processors execute the computer instructions, the terminal device is enabled to perform any one of the possible implementations of the first aspect.

According to a fifth aspect, an embodiment of this application provides a network device, including one or more processors and one or more memories, where the one or more memories are coupled to the one or more processors, the one or more memories are configured to store computer program code, the computer program code includes computer instructions, and when the one or more processors execute the computer instructions, the network device is enabled to perform any one of the possible implementations of the second aspect or the third aspect.

According to a sixth aspect, an embodiment of this application provides a computer storage medium, where the computer storage medium stores a computer program, the computer program includes program instructions, and when the program instructions are run on a terminal device, the terminal device is enabled to perform any one of the possible implementations of the first aspect, the second aspect, or the third aspect.

According to a seventh aspect, an embodiment of this application provides a computer product, where when the computer program product runs on a computer, the computer is enabled to perform any one of the possible implementations of the first aspect, the second aspect, or the third aspect.

BRIEF DESCRIPTION OF DRAWINGS

FIG. 5A to FIG. 5C each are a schematic structural diagram of random access response signaling according to an embodiment of this application;

FIG. 6A to FIG. 6D each are a schematic structural diagram of signaling of a media access layer control element according to an embodiment of this application;

DESCRIPTION OF EMBODIMENTS

Figure 1A:
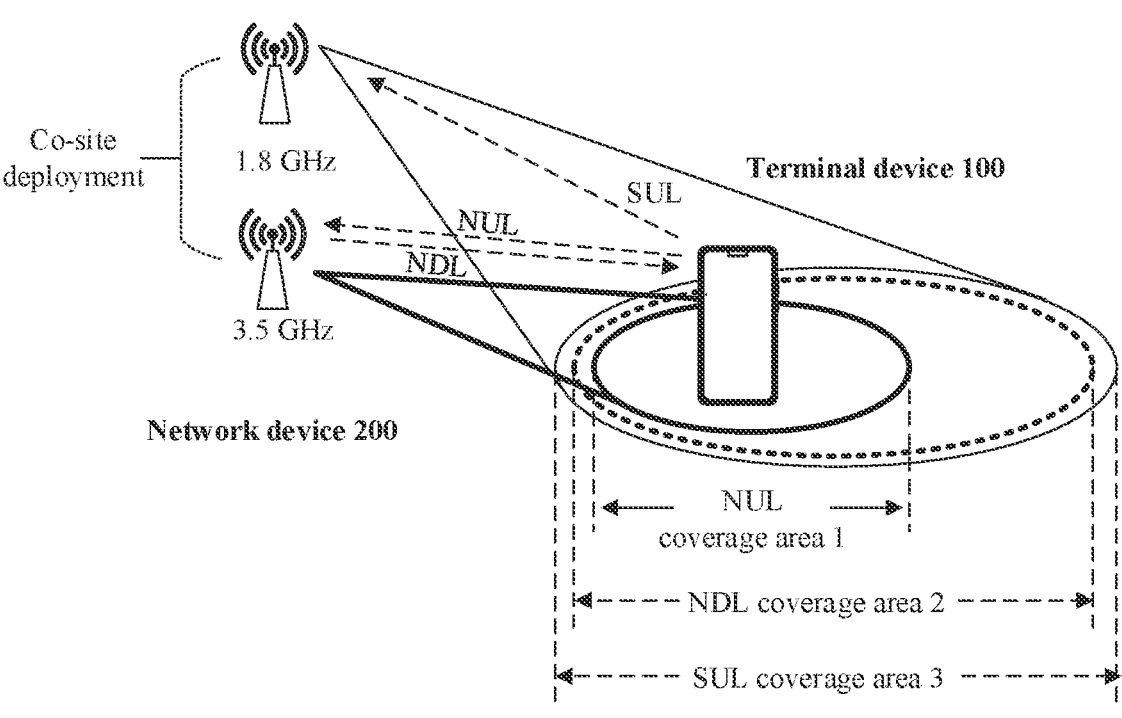
FIG. 1A is a schematic system structural diagram of a communication system in co-site deployment according to an embodiment of this application.

The following clearly and completely describes the technical solutions in embodiments of this application with reference to the accompanying drawings in embodiments of this application. In the descriptions of embodiments of this application, unless otherwise specified, "/" indicates "or". For example, A/B may indicate A or B. The term "and/or" in this specification merely describes an association relationship for describing associated objects, and indicates that three relationships may exist. For example, A and/or B may indicate the following three cases: Only A exists, both A and B exist, and only B exists. In addition, in the descriptions of embodiments of this application, "a plurality of" means two or more.

It should be understood that the terms "first", "second", and the like in the specification, claims, and accompanying drawings of this application are intended to distinguish between different objects but do not indicate a particular order. In addition, the terms "including" and "having" and any other variants thereof are intended to cover a non-exclusive inclusion. For example, a process, a method, a system, a product, or a device that includes a series of steps or units is not limited to the listed steps or units, but optionally further includes an unlisted step or unit, or optionally further includes another inherent step or unit of the process, the method, the product, or the device.

An "embodiment" mentioned in this application means that a particular feature, structure, or characteristic described with reference to this embodiment may be included in at least one embodiment of this application. The phrase shown in various locations m this specification may neither neces-sarily mean a same embodiment, nor mean an independent or optional embodiment exclusive from another embodiment. Persons skilled in the art explicitly and implicitly understand that embodiments described in this application may be combined with other embodiments.

To compensate for a defect that a coverage area of an NUL of a terminal device is far less than a coverage area of an NDL of a network device, an SUL is introduced in an NR protocol of the 3GPP. The SUL is mainly used to improve a coverage area of an uplink carrier. A network device corre-sponding to the NUL and a network device corresponding to the SUL have two deployment modes: co-site deployment and non-co-site deployment.

The following specifically describes two communication systems in co-site deployment and non-co-site deployment in embodiments of this application.

FIG. 1A shows an example of a system structure of a communication system in co-site deployment according to an embodiment of this application.

Figures 1B, 2:
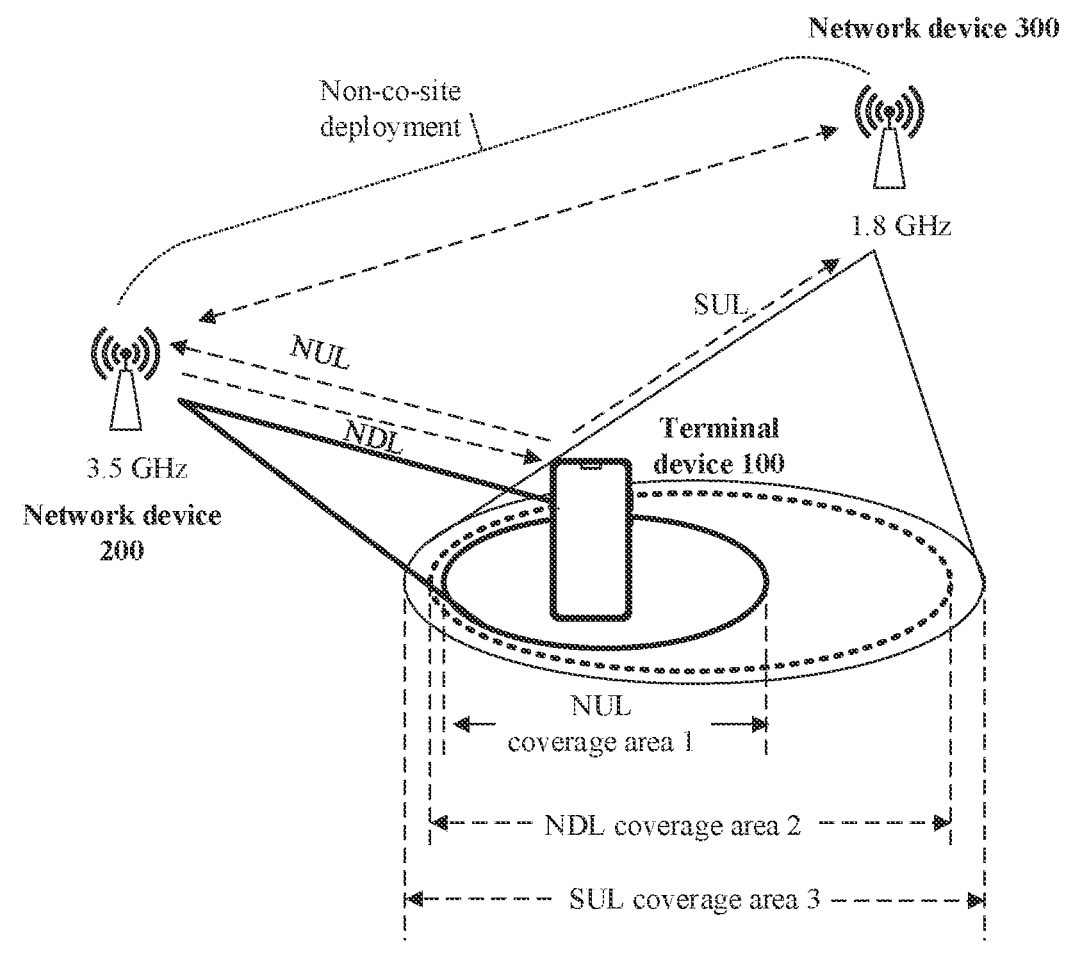
FIG. 1B is a schematic system structural diagram of a communication system in non-co-site deployment according to an embodiment of this application.
FIG. 2 is a schematic diagram of resource configuration of an NUL and an SUL according to an embodiment of this application.

FIG. 1B shows an example of a system structure of a communication system in non-co-site deployment according to an embodiment of this application.

As shown in FIG. 1A and FIG. 1B, both of the two communication systems in the co-site deployment and the non-co-site deployment in embodiments of this application may include one or more terminal devices (for example, a terminal device 100 shown in FIG. 1A and FIG. 1B), and one or more network devices (for example, a network device 200 and a network device 300 of FIG. 1A and FIG. 1B). As shown in FIG. 1A, the network device 200 corresponding to an NUL and the network device 300 corresponding to an SUL are in the co-site deployment. As shown in FIG. 1B, the network device 200 corresponding to an NUL and the network device 300 corresponding to an SUL are in the non-co-site deployment. The terminal device is connected to the network device in a wireless manner, and the terminal device may be at a fixed location or may be movable.

The network device is an access device used by the terminal device to access the communication system in the wireless manner, and has a wireless transceiver function. The device includes but is not limited to an evolved NodeB (evolved NodeB, eNB), a radio network controller (radio network controller, RNC), a NodeB (NodeB, NB), a base station controller (base station controller, BSC), a base transceiver station (base transceiver station, BTS), a home base station (for example, a home evolved NodeB, or a home NodeB, HNB), a baseband unit (baseband unit, BBU), a next generation NodeB (next Generation NodeB, gNB) in a 5G NR network, a transmission point (a TRP or a TP), a network node, for example, a baseband unit (BBU) or a distribution unit (distribution unit, DU), that forms a gNB or a trans-mission point, or the like. A specific radio access technology and a specific device form used by the network device are not limited in embodiments of this application. In embodi-ments of this application, an example in which the network device is a base station is used for description.

The terminal device may also be referred to as user equipment (user equipment, UE), an access terminal, a subscriber unit, a subscriber station, a mobile station, a remote station, a remote terminal, a mobile device, a user terminal, a terminal, a wireless communication device, a user agent, or a user apparatus. The terminal device in embodiments of this application may be a mobile phone (mobile phone), a tablet computer (Pad), a computer having a wireless transceiver function, a virtual reality (virtual reality, VR) terminal device, an augmented reality (aug-mented reality, AR) terminal device, a wireless terminal in industrial control, a wireless terminal in self-driving (self-driving), a wireless terminal in remote medical, a wireless terminal in a smart grid, a wireless terminal in transportation safety, a handheld device, an in-vehicle device, a wearable device, and the like. This is not limited herein.

The network device and the terminal device may be deployed on the land, including an indoor device, an outdoor device, a handheld device, or a vehicle-mounted device; may be deployed on the water surface; or may be deployed on a plane and a satellite in the air. This is not limited in embodiments of this application.

It should be understood that FIG. 1A or FIG. 1B is merely a schematic system structural diagram of the communication system according to an embodiment of this application. The communication system may further include another device, for example, may further include a wireless relay device and a wireless backhaul device (not shown in FIG. 1A or FIG. 1B). This is not limited herein. A quantity of terminal devices and a quantity of network devices included in the foregoing communication system are not limited in embodi-ments of this application.

As shown in FIG. 1A and FIG. 1B, the network device 200 may provide an NUL service and an NDL service for the terminal device 100. A carrier frequency band of an NUL and an NDL is usually a high frequency band (for example, of 3.5 GHz), and is limited by transmit power of the terminal device 100. Generally, an uplink coverage area (for example, an NUL coverage area 1) of the NUL is far less than a downlink coverage area (for example, an NDL coverage area 2) of the NDL. The network device 300 may provide an SUL service for the terminal device 100. A carrier frequency band is usually a low frequency band (for example, of 1.8 GHz), and an uplink coverage area (for example, an SUL coverage area 3) of an SUL is far greater than the uplink coverage area of the NUL. The terminal device 100 may perform uplink data transmission through the NUL or the SUL. If the terminal device 100 performs the uplink data transmission through the NUL, when a coverage capability of an NUL uplink carrier becomes poor, the uplink data transmission performed by the terminal device 100 through the NUL may be switched to the uplink data transmission performed by the terminal device 100 through the SUL, to overcome a defect that the uplink coverage area of the NUL is less than the coverage area (for example, the NDL coverage area 2) of the NDL. In addition, the SUL of a low frequency band is introduced into a communication system, so that flexibility of spectrum usage can be increased.

For example, FIG. 2 is a schematic diagram of an SUL time-frequency resource configured by a cell Cell1 for a terminal device UE1, where Cell1 is an ID of a primary cell corresponding to an NDL and an NUL, and an SUL is a supplementary uplink of the cell Cell1. Data sending cannot be simultaneously performed through the NUL and the SUL. For example, when data is sent in a last slot through the NUL on a carrier 1, the data cannot be sent in the last slot through the SUL on a carrier 2. Conversely, when the data is sent in the last slot through the SUL on the carrier 2, the data cannot be sent in the last slot through the NUL on the carrier 1.

In an implementation, the data may be sent in a same slot on the carrier 1 and the carrier 2.

It should be noted that, in FIG. 2, the SUL time-frequency resource is described only by using a time division duplex (Time Division Duplex, TDD) standard only as an example, but is not limited to the TDD standard. The SUL time-frequency resource may alternatively be described by using a frequency division duplex (Frequency Division Duplex, FDD) standard as an example. This is not specifically limited herein.

An important characteristic of uplink data transmission is that different terminal devices perform orthogonal multiple access at a time frequency, that is, uplink data transmission of the different terminal devices in a same cell (Cell) does not interfere with each other. To ensure orthogonality of the uplink data transmission and avoid intra-cell (intra-cell) interference, a network device usually requires that time at which signals from different terminal devices in a same subframe but on different frequency domain resources arrive at the network device be basically aligned. In a long term evolution (long term evolution, LTE) network or an NR network, the network device receives, by using a unified detection window, uplink signals sent by a plurality of terminal devices. To avoid inter-subcarrier interference between the terminal devices, a timing offset between arriving by the uplink signals of the plurality of terminal devices in a cell at the network device needs to be controlled within a range less than a cyclic prefix (Cyclic Prefix, CP) length of an orthogonal frequency division multiplexing (Orthogonal Frequency Division Multiplexing, OFDM) symbol. Therefore, the network device separately sends a timing adjustment command to each terminal device.

Figure 3:
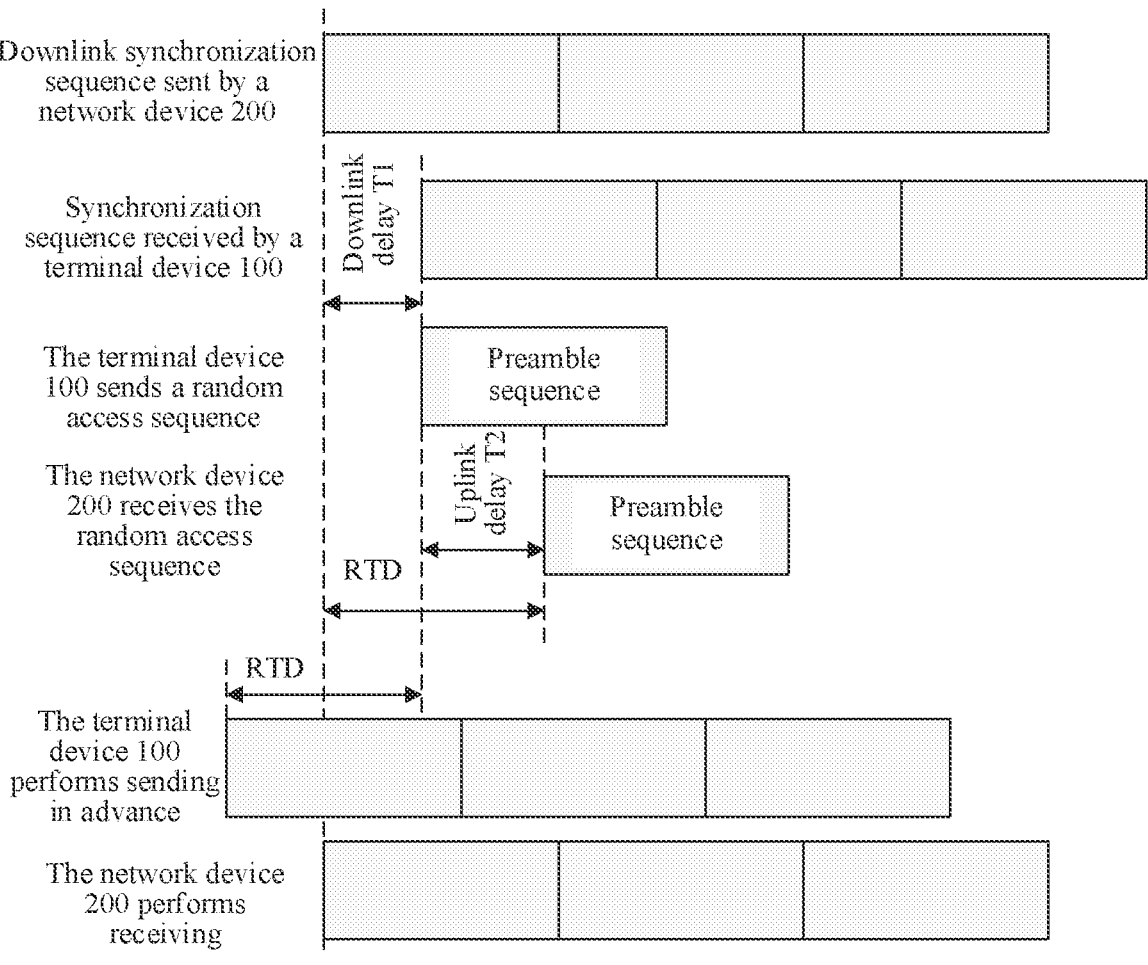
FIG. 3 is a schematic principle diagram of timing advance according to an embodiment of this application.

To ensure time synchronization of the network device, an uplink TA is introduced in an LTE/NR protocol. To be specific, in a scenario in which the terminal device performs the uplink data transmission, to enable uplink data to arrive at the network device at expected time, the network device may estimate a radio frequency transmission delay caused by a factor such as a distance. Then, the terminal device is notified of the TA for sending the uplink data, and the terminal device may calculate, based on the TA, time T that needs to be advanced for sending the uplink data. For example, as shown in FIG. 3, at a synchronization start point of a downlink synchronization subframe, a network device 200 sends a downlink synchronization sequence, and after a downlink delay T1, a terminal device 100 receives the downlink synchronization sequence. A random access sequence (for example, a Preamble sequence) is generated based on the downlink synchronization sequence, and the random access sequence is sent to the network device 200. After an uplink delay T2, the network device 200 receives the random access sequence. In this case, time T that needs to be advanced for sending uplink data is an uplink and downlink round trip transmission delay (Round Trip Delay, RTD), that is, a sum of the downlink delay T1 and the uplink delay T2. In other words, the terminal device 100 needs to send the uplink data in advance of time of the RTD from a moment at which the downlink synchronization sequence is received, to ensure that the network device 200 receives, at the synchronization start point of the downlink synchronization subframe, the uplink data sent by the terminal device 100.

In a co-site deployment (co-site deployment) scenario, as shown in FIG. 1A, a signal propagation path of the NUL of the network device 200 is basically the same as a signal propagation path of the SUL of the network device 300, for a same path, propagation delays of different frequency bands are almost the same (in an ideal case), and the NUL and the SUL may use a same timing advance group (Timing Advance Group, TAG) and share a same timing advance command (Timing Advance Command, TAC). Therefore, it is generally considered that a TA of the NUL of the network device 200 is the same as a TA of the SUL of the network device 300, and only one TA needs to be maintained.

However, in a non-co-site deployment (Non-co-site deployment) scenario, as shown in FIG. 1B, because the network device 200 and the network device 300 are located in different physical spaces, an actual TA of the NUL of the network device 200 is different from an actual TA of the SUL of the network device 300 due to factors such as a transmission path, a path loss, and the Doppler effect. In this case, if only a same TA is maintained for the NUL of the network device 200 and the SUL of the network device 300, transmission performance of the SUL of the network device 300 may deteriorate, and user experience is poor.

Embodiments of this application provide an uplink synchronization method. A network device may send a TA of an NUL and a TA of an SUL to a terminal device. The terminal device may adjust, based on the TA of the NUL, time for sending uplink data through the NUL, and adjust, based on the TA of the SUL, time for sending data through the SUL. In other words, the terminal device may independently maintain the TA of the NUL and the TA of the SUL, and then separately adjust the time for sending uplink data through the NUL and the time for sending uplink data through the SUL, to optimize transmission performance of the SUL and improve user experience.

It should be noted that, in embodiments of this application, only a non-co-site deployment scenario is used as an example to describe the uplink synchronization method. The uplink synchronization method is also applicable to the co-site deployment scenario. This is not limited herein.

The non-co-site deployment scenario is used as an example. Embodiments of this application provide an uplink synchronization method. In an initial access phase, a terminal device 100 may determine a random access preamble 1 and a random access preamble 2 based on a broadcast message of a network device 200, and initiate random access through an NUL and an SUL. A network device 300 may calculate a TA of the SUL based on the random access preamble 1, and the network device 200 may calculate a TA of the NUL based on the random access preamble 2. Then, the terminal device 100 may adjust, based on the TA of the SUL, time for sending uplink data through the SUL, and adjust, based on the TA of the NUL, time for sending uplink data through the NUL. In a connection phase, the terminal device 100 may also continuously adjust, based on the TA of the SUL, the time for sending uplink data through the SUL, and adjust, based on the TA of the NUL, the time for sending uplink data through the NUL. When embodiments of this application are implemented, the terminal device can be enabled to independently maintain the TA of the NUL and the TA of the SUL, to optimize transmission performance of the SUL, and improve user experience.

Figure 4A:
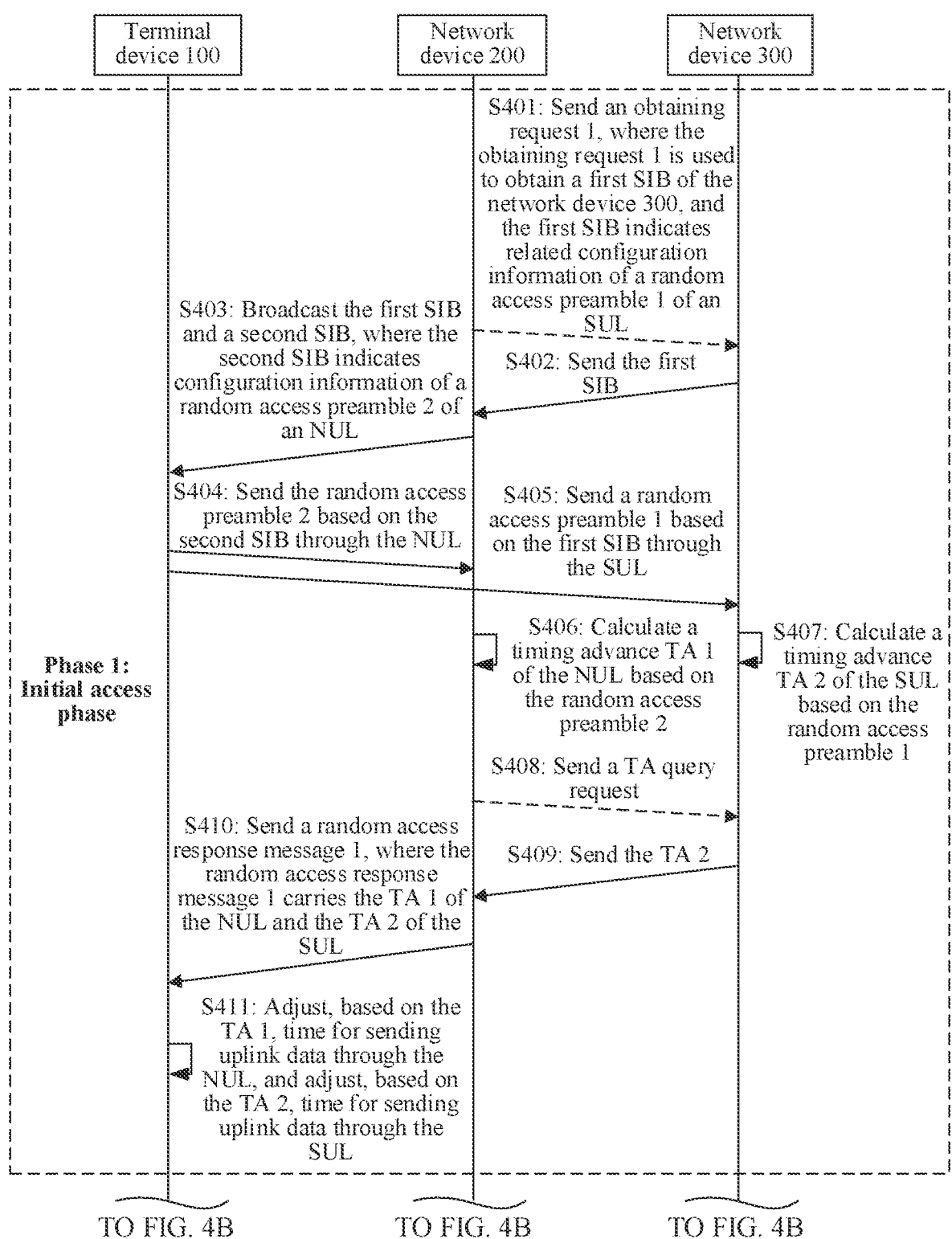
FIG. 4A and FIG. 4B are a schematic flowchart of an uplink synchronization method according to an embodiment of this application.
Figure 4B:
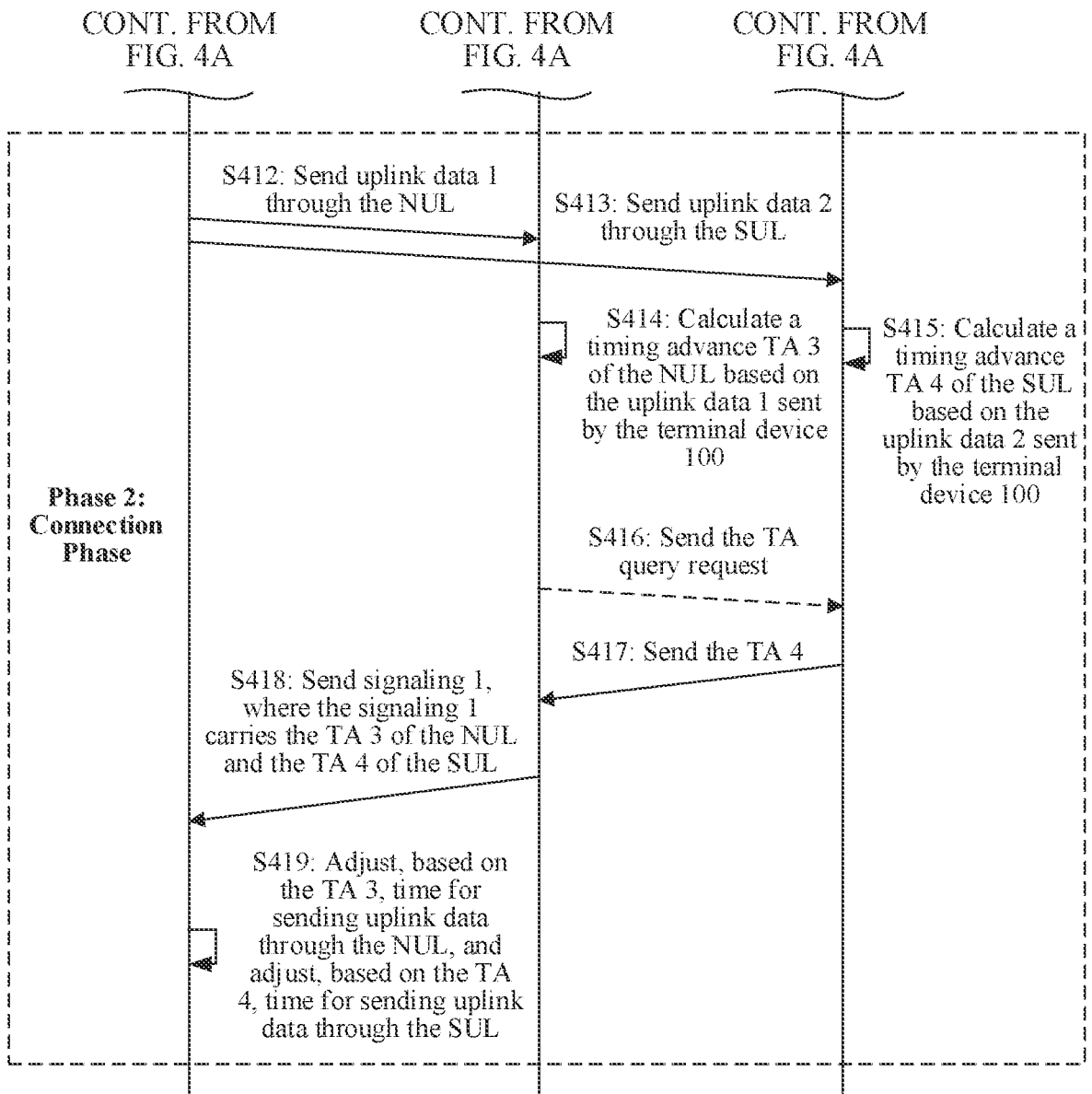

The following describes in detail a method procedure of the foregoing uplink synchronization method. FIG. 4A and FIG. 4B show an example of a method procedure of an uplink synchronization method according to an embodiment of this application.

As shown in FIG. 4A and FIG. 4B, the method may be applied to a communication system that includes a terminal device 100, a network device 200, and a network device 30). The network device 200 may provide an NUL service and an NDL service for the terminal device 100, and the network device 300 may provide an SUL service for the terminal device 100. Specific steps of the method are described in detail below.

Phase 1: Initial Access Phase

S401: The network device 200 sends an obtaining request 1 to the network device 300, where the obtaining request 1 is used to obtain a first system information block (System Information Block, SIB) of the network device 300, and the first SIB indicates configuration information of a random access preamble 1 of the SUL.

S402: After receiving the obtaining request 1 sent by the network device 200, the network device 300 sends the first SIB to the network device 200.

In some embodiments, the first SIB carries bandwidth part (Bandwidth Part, BWP) initial configuration information, and the BWP initial configuration information may include basic configuration information of a physical random access channel (Physical Random Access Channel, PRACH), a physical uplink shared channel (Physical Uplink Shared Channel, PUSCH), and a physical uplink control channel (Physical Uplink Control Channel, PUCCH). A root sequence number in the basic configuration information of the PRACH may be used to determine the random access preamble 1, and time-frequency information of the physical random access channel (Physical Random Access Channel, PRACH) may indicate a time-frequency resource occupied by the PRACH. In some embodiments, the first SIB further carries common configuration information of the SUL, and the common configuration information may include frequency information of the SUL, a time alignment timer (Time Alignment Timer, TAT), and the like.

The first SIB may be one or more SIBs. For example, the first SIB may include at least one of a SIB 1, a SIB 2, a SIB 3, a SIB 4, a SIB 5, and a SIB 6. In addition to the first SIB, the network device 300 may indicate the configuration information of the random access preamble 1 of the SUL by using another system message. This is not limited herein.

It may be understood that, because there is no downlink between the network device 300 and the terminal device 100 to send data, if the network device 300 needs to send data to the terminal device 100, the network device 300 may first send the data to the network device 200, and then send the data to the terminal device 100 through a downlink NDL of the network device 200. Therefore, in a subsequent step, all the configuration information of the network device 300 received by the terminal device 100 is sent through the downlink NDL of the network device 200.

In some embodiments, step S401 is optional. The network device 300 may periodically send the first SIB to the network device 200, and the network device 200 does not need to send the foregoing obtaining request 1 to the network device 300 in advance.

In this embodiment of this application, before step S401 and step S402 are performed, the network device 200 and the network device 300 need to perform timing synchronization. A possible implementation of the timing synchronization includes but is not limited to the following three implementations:

Implementation 1: The timing synchronization between the network device 200 and the network device 300 is completed when non-co-site deployment is performed on the network device 200 and the network device 300, and a related operation of the timing synchronization does not need to be performed between the network device 200 and the network device 300 subsequently.

Implementation 2: The network device 200 sends a synchronization request to the network device 300, where the synchronization request carries a timing clock of the network device 200; and the network device 300 may perform the timing synchronization with the network device 200 based on the foregoing synchronization request sent by the network device 200.

Similarly, the network device 300 may also send a synchronization request to the network device 200, where the synchronization request carries a timing clock of the network device 300; and the network device 200 may perform the timing synchronization with the network device 300 based on the foregoing synchronization request sent by the network device 300.

Implementation 3: The network device 200 sends the synchronization request to the network device 300, where the synchronization request carries the timing clock of the network device 200; and the network device 300 may calculate a time offset between the timing clock of the network device 300 and the timing clock of the network device 200 based on the foregoing synchronization request sent by the network device 200. Subsequently, the TA of the SUL may be calculated based on the time offset.

Similarly, the network device 300 may also send the synchronization request to the network device 200, where the synchronization request carries the timing clock of the network device 300; and the network device 200 may calculate the time offset between the timing clock of the network device 200 and the timing clock of the network device 300 based on the foregoing synchronization request sent by the network device 300. Subsequently, the TA of the SUL may be calculated based on the time offset.

S403: The network device 200 broadcasts the first SIB and a second SIB, where the second SIB indicates configuration information of a random access preamble 2 of the NUL. In some embodiments, the second SIB carries normal configuration information of the NUL, and the normal configuration information may include frequency information of the NUL, a TAT, BWP initial configuration information, and the like. The BWP initial configuration information may include basic configuration information of an RACH, a PUSCH, and a PUCCH. A root sequence number in the basic configuration information of the RACH may be used to determine the random access preamble 2, and time-frequency information of the PRACH may indicate a time-frequency resource occupied by the PRACH.

The second SIB may be one or more SIBs. For example, the second SIB may include at least one of a SIB 1, a SIB 2, a SIB 3, a SIB 4, a SIB 5, and a SIB 6. In addition to the second SIB, the network device 200 may indicate the configuration information of the random access preamble 2 of the NUL by using another system message. This is not limited herein.

S404: The terminal device 100 sends the random access preamble 2 to the network device 200 based on the second SIB through the NUL.

Specifically, after receiving the first SIB and the second SIB, the terminal device 100 may determine, based on the second SIB, content, a format, transmit power, a time-frequency resource, and the like for sending the random access preamble 2. Then, the terminal device 100 may send, through the NUL, the random access preamble 2 on the time-frequency resource indicated by the time-frequency information of the PRACH in the second SIB.

S405: The terminal device 100 sends the random access preamble 1 to the network device 300 based on the first SIB through the SUL.

Specifically, after receiving the first SIB and the second SIB, the terminal device 100 may determine, based on the first SIB, content, a format, transmit power, a time-frequency resource, and the like for sending the random access preamble 1. Then, the terminal device 100 may send, through the SUL, the random access preamble 1 on the time-frequency resource indicated by the time-frequency information of the PRACH in the first SIB.

In some embodiments, in step S403, the network device 200 further broadcasts a deployment identifier and/or a multi-TA identifier. The deployment identifier indicates that the network device 200 and the network device 300 are in non-co-site deployment, and the multi-TA identifier indicates that the TA of the NUL and the TA of the SUL are independently maintained. The terminal device 100 determines, based on the deployment identifier and/or the multi-TA identifier, to send the random access preamble 2 to the network device 200 through the NUL and to send the random access preamble 1 to the network device 300 through the SUL in step S404 and step S405.

It may be understood that, in some embodiments, when the terminal device 100 receives the deployment identifier and/or the multi-TA identifier broadcast by the network device 200, the terminal device 100 determines to independently maintain the TA of the NUL and the TA of the SUL. The terminal device 100 sends the random access preamble 2 and the random access preamble 1 through the NUL and the SUL respectively. When the terminal device 100 does not receive the deployment identifier and/or the multi-TA identifier broadcast by the network device 200, the terminal device 100 determines to use a conventional TA maintenance solution, that is, the NUL and the SUL share a same TA. It should be noted that a time sequence of performing step S404 and performing step S405 is not limited in this embodiment of this application.

S406: The network device 200 calculates a timing advance TA 1 of the NUL based on the random access preamble 2.

Specifically, the network device 200 may calculate the TA 1 of the NUL based on the random access preamble 2 by using an NDL timing moment as a reference.

For example, time T that needs to be advanced for sending uplink data by the terminal device 100 is equal to a downlink delay T1 plus an uplink delay T2. The downlink delay T1 is a time interval from sending a downlink synchronization sequence (for example, the first SIB and the second SIB that are broadcast by the network device 200) by the network device 200 to receiving the downlink synchronization sequence by the terminal device 100, and the uplink delay T2 is a time interval from sending a random access sequence (for example, the random access preamble 2) by the terminal device 100 to receiving the random access sequence by the network device 200.

A time granularity of the uplink synchronization is usually 16 Ts, that is, uplink synchronization adjustment is usually performed in a unit of 16 Ts, where 16 Ts=0.52 μs.

In this case, a value of the TA 1 of the NUL is (T1+T2)/ 0.52 μs. For example, a coverage area radius of the network device 200 is 5 km. In this case, a maximum value of the TA 1 of the NUL is 5 km/(300,000 km/s*0.52 μs/2), which is about 641.

It may be understood that, to ensure time synchronization on a network device side, the terminal device 100 needs to send the uplink data in advance of time of (T1+T2) from a moment (that is, the NDL timing moment) at which the downlink synchronization sequence is received, to ensure that the network device 200 receives, at a synchronization start point of a downlink synchronization subframe, the uplink data sent by the terminal device 100.

S407: The network device 300 calculates a timing advance TA 2 of the SUL based on the random access preamble 1.

Specifically, the network device 300 may also calculate the TA 2 of the SUL based on the random access preamble 1 by using the NDL timing moment as a reference.

For example, time T' that needs to be advanced for sending the uplink data by the terminal device 100 is equal to a downlink delay T1' plus an uplink delay T2'. The downlink delay T1' is a time interval from sending a downlink synchronization sequence (for example, the first SIB and the second SIB that are broadcast by the network device 200) by the network device 200 to receiving the downlink synchronization sequence by the terminal device 100, and the uplink delay T2' is a time interval from sending a random access sequence (for example, the random access preamble 1) by the terminal device 100 to receiving the random access sequence by the network device 300.

Similarly, a value of the TA 2 of the SUL is (T1'+T2')/0.52 μs. For example, a coverage area radius of the network device 300 is 10 km. In this case, a maximum value of the TA 2 of the SUL is 10 km/(300,000 km/s*0.52 μs/2), which is about 1282.

It may be understood that, to ensure the time synchronization on the network device side, the terminal device 100 needs to send the uplink data in advance of time of (T1'+T2') from a moment (that is, the NDL timing moment) at which the downlink synchronization sequence is received, to ensure that the network device 300 receives, at the synchronization start point of the downlink synchronization subframe, the uplink data sent by the terminal device 100.

It should be noted that a time sequence of performing step S406 and performing step S407 is not limited in this embodiment of this application.

S408: The network device 200 sends a TA query request to the network device 300.

In some embodiments, the network device 200 may periodically send the TA query request to the network device 300.

In some other embodiments, the network device 200 may send the TA query request to the network device 300 after completing calculating the TA 1 of the NUL (that is, completing performing step S406).

S409: The network device 300 sends the TA 2 of the SUL to the network device 200.

Specifically, after receiving the TA query request sent by the network device 200, the network device 300 may send the TA 2 of the SUL to the network device 200.

In some embodiments, step S408 is optional. The network device 300 may send the TA 2 of the SUL to the network device 200 after completing calculating the TA 2 of the SUL (that is, completing performing step S407). The network device 200 does not need to send the TA query request to the network device 300 in advance.

S410: The network device 200 sends a random access response (Random Access Response, RAR) message 1 to the terminal device 100, where the random access response message 1 carries the TA 1 of the NUL and the TA 2 of the SUL.

Specifically, after receiving the TA 2 of the SUL sent by the network device 300, the network device 200 may send the random access response message 1 to the terminal device 100, where the random access response message 1 carries both the TA 1 of the NUL and the TA 2 of the SUL. In other words, the network device 200 may send both the TA 1 of the NUL and the TA 2 of the SUL to the terminal device 100.

In some embodiments, the network device 200 may separately send the TA 1 of the NUL or the TA 2 of the SUL. For example, after completing calculating the TA 1 of the NUL and before sending the TA query request to the network device 300, the network device 200 may separately send the TA 1 of the NUL to the terminal device 100. For another example, after sending the TA query request to the network device 300, the network device 200 may separately send the TA 1 of the NUL to the terminal device 100. For still another example, after receiving the TA 2 of the SUL sent by the network device 300, the network device 200 may separately send the TA 1 of the NUL and the TA 2 of the SUL to the terminal device 100.

In an implementation, after step S409, the network device 200 sends a random access response message 3 to the terminal device 100, and sends a random access response message 4 to the terminal device 100. The random access response message 3 carries the TA 1 of the NUL, and the random access response message 4 carries the TA 2 of the SUL. A sending sequence of the random access response message 3 and the random access response message 4 is not specifically limited herein.

In some other embodiments, the network device 200 may alternatively send the TA 1 of the NUL and a first difference between the TA 2 of the SUL and the TA 1 of the NUL to the terminal device 100.

The following describes three possible design manners of RAR signaling used when the network device 200 sends the TA 1 of the NUL and/or the TA 2 of the SUL to the terminal device 100.

Figures 5A, 5B:
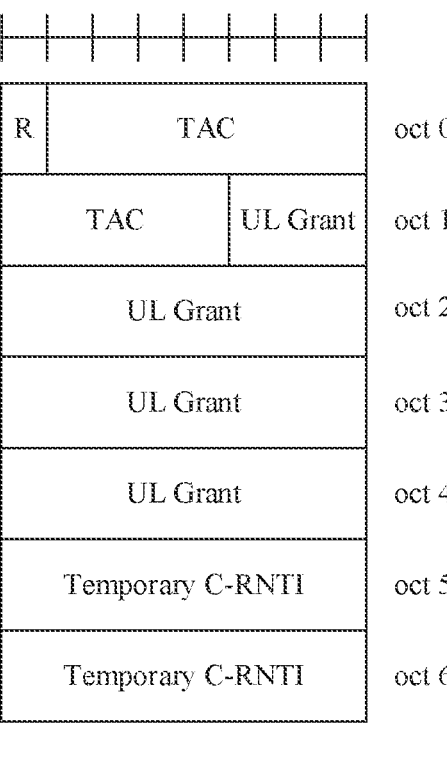

Design manner 1: As shown in FIG. 5A, the design manner is applicable to a case in which the network device 200 separately sends the TA 1 of the NUL or the TA 2 of the SUL to the terminal device 100.

In the design manner shown in FIG. 5A, the RAR signaling has seven octs (octets) in total, namely, an oct 0 to an oct 6, and each oct has eight bits. R is a reserved bit, and occupies one bit (that is, a $1^{st}$ bit of the oct 0). A TAC field is used to store the TA 1 of the NUL or the TA 2 of the SUL, and occupies 12 bits (that is, the last seven bits of the oct 0 and the first five bits of the oct 1). An index value of a TA corresponding to the field ranges from 0 to 4096. A UL Grant (Uplink Grant) field indicates a grant of an uplink transmission resource of the NUL or the SUL, and occupies 27 bits (that is, the last three bits of the oct 1 and all bits of the oct 2, the oct 3, and the oct 4). A Temporary C-RNTI (Cell- Radio Network Temporary Identifier, C-RNTI) field is used to store a cell radio network temporary identifier, and occupies 16 bits (that is, all bits of the oct 5 and the oct 6).

The reserved bit R in the RAR signaling in FIG. 5A is used as an indication bit of SUL TAC or NUL TAC.

In some embodiments, when R is 0, the RAR signaling is an uplink random access response of the NUL, the TAC field in the RAR signaling stores the TA 1 of the NUL, and the UL Grant field indicates the grant of the uplink transmission resource of the NUL. When R is 1, the RAR signaling is an uplink random access response of the SUL, the TAC field in the RAR signaling stores the TA 2 of the SUL, and the UL Grant field indicates the grant of the uplink transmission resource of the SUL.

Conversely, in some other embodiments, when R is 0, the RAR signaling is the uplink random access response of the SUL, the TAC field in the RAR signaling stores the TA 2 of the SUL, and the UL Grant field indicates the grant of the uplink transmission resource of the SUL. When R is 1, the RAR signaling is for the uplink random access response of the NUL, the TAC field in the RAR signaling stores the TA 1 of the NUL, and the UL Grant field indicates the grant of the uplink transmission resource of the NUL.

It should be noted that, because the NUL and the SUL correspond to a same cell ID (Identifier), no matter whether the network device 200 sends the TA 1 of the NUL or the TA 2 of the SUL, the cell radio network temporary identifier stored in Temporary C-RNTI remains unchanged.

Design manner 2: As shown in FIG. 5B, the design manner is applicable to a case in which the network device 200 simultaneously sends the TA 1 of the NUL and the TA 2 of the SUL to the terminal device 100.

In the design manner shown in FIG. 5B, the RAR signaling has eight octs in total, namely, an oct 0 to an oct 7, and each oct has eight bits. R is a reserved bit, and occupies one bit (that is, a $1^{st}$ bit of the oct 0). A TAC 1 field is used to store the TA 1 of the NUL, and occupies 12 bits (that is, the last seven bits of the oct 0 and the first five bits of the oct 1). An index value of a TA corresponding to the field ranges from 0 to 4096. A TAC 2 field is used to store the TA 2 of the SUL, and occupies 8 bits (that is, the last three bits of the oct 1 and the first five bits of the oct 2). An index value of a TA corresponding to the field ranges from 0 to 256. A UL Grant field indicates a grant of an uplink transmission resource of the NUL and the SUL, and occupies 27 bits (that is, the last three bits of the oct 2 and all bits of the oct 3, the oct 4, and the oct 5). A Temporary C-RNTI field is used to store a cell radio network temporary identifier, and occupies 16 bits (that is, all bits of the oct 6 and the oct 7). In this embodiment of this application, the RAR signaling shown in FIG. 5B may be an uplink random access response shared by the NUL and the SUL.

In some embodiments, a value of the reserved bit R may indicate whether the TAC 1 field stores the TA of the NUL or the TA of the SUL. For example, when R is 0, it indicates that the TAC 1 field stores the TA 1 of the NUL, and the TAC 2 field stores the TA 2 of the SUL. For another example, when R is 1, it indicates that the TAC 1 field stores the TA 2 of the SUL, and the TAC 2 field stores the TA 1 of the NUL.

In some other embodiments, based on a related protocol standard, content stored in the TAC 1 field and the TAC 2 field may be defaulted.

In some embodiments, the network device 200 prepro-cesses the TA values stored in the TAC 1 and the TAC 2, to ensure that the TA values stored in the TAC 1 and the TAC 2 are positive. After receiving the TAC 1 and the TAC 2, the terminal device 100 may de-preprocess the TA values stored in the TAC 1 and the TAC 2. In an implementation, the preprocessing may be increasing, by a preset value, the TA values stored in the TAC 1 and the TAC 2. For example, the preset value is 64 Ts.

Design manner 3: As shown in FIG. 5C, the design manner is applicable to a case in which the network device 200 simultaneously sends the TA 1 of the NUL and the first difference between the TA 2 of the SUL and the TA 1 of the NUL to the terminal device 100.

It is different from FIG. 5B that a sign bit S is added in FIG. 5C, and occupies one bit (that is, a $6^{th}$ bit of an oct 1). The sign bit S represents whether a value stored in TAC 2 is positive or negative. A TAC 2 field is used to store a difference between the TA 2 of the SUL and the TA 1 of the NUL, and occupies seven bits (that is, the last two bits of the oct 1 and the first five bits of an oct 2).

It may be understood that the TA 2 of the SUL may be a sum of a value stored in the TAC 2 field and a value stored in a TAC 1 field (the TA 1 of the NUL).

For other related content of FIG. 5C, refer to the text descriptions of FIG. 5B. Details are not described herein again.

It should be noted that the design manner of the RAR signaling includes but is not limited to the foregoing three design manners. This is not limited in this embodiment of this application.

S411: The terminal device 100 adjusts, based on the TA 1 of the NUL, time for sending uplink data through the NUL, and adjusts, based on the TA 2 of the SUL, time for sending uplink data through the SUL.

For the SUL, in some embodiments, after receiving the TA 2 of the SUL sent by the network device 200, the terminal device 100 may adjust, based on the TA 2 of the SUL, the time for sending uplink data through the SUL. In some other embodiments, the terminal device 100 may alternatively calculate the TA 2 of the SUL after receiving the TA 1 of the NUL and the first difference between the TA 2 of the SUL and the TA 1 of the NUL that are sent by the network device 200, and then adjust, based on the TA 2 of the SUL, the time for sending uplink data through the SUL.

In the initial access phase, that the terminal device 100 adjusts, based on a TA, the time for sending the uplink data specifically includes: Relative to current time for sending the uplink data, the terminal device 100 calculates, based on the received TA, a value of time that needs to be advanced for sending the uplink data, that is, calculates a size of a time adjustment value $N_{TA}$ needed to send the uplink data. A calculation formula of $N_{TA}$ is as follows: $N_{TA}=TA\times16$ (unit: Ts), where the TA is a timing advance that is sent by the network device 200 and that is received by the terminal device 100, Ts is a basic time unit of a physical layer, and 16 Ts=0.52 µs. In an implementation, for the NUL, $N_{TA\ 1}=TA\ 1\times16$ Ts. For the SUL, $N_{TA\ 2}=TA\ 2\times16$ Ts.

Phase 2: Connection Phase

S412: The terminal device 100 sends uplink data 1 through the NUL.

Specifically, after completing initial access and entering a connected mode, the terminal device 100 may send the uplink data 1 to the network device 200 through the NUL. The uplink data 1 may be a sounding reference signal (Sounding Reference Signal, SRS), a demodulation reference signal (Demodulation Reference Signal, DMRS), a channel quality indicator (Channel Quality Indicator, CQI), a positive feedback (Acknowledgement, ACK), a negative feedback (Negative Acknowledgement, NACK), or the like. This is not limited in this embodiment of this application.

S413: The terminal device 100 sends uplink data 2 through the SUL.

Specifically, after completing initial access and entering the connected mode, the terminal device 100 may send the uplink data 2 to the network device 300 through the SUL. The uplink data 2 may be an SRS, a DMRS, a CQI, an ACK, a NACK, or the like. This is not limited in this embodiment of this application.

It should be noted that a time sequence of performing step S412 and performing step S413 is not limited in this embodiment of this application.

S414: The network device 200 calculates a timing advance TA 3 of the NUL based on the uplink data 1 sent by the terminal device 100.

In this embodiment of this application, the network device 200 calculates the TA based on the uplink delay of the uplink data sent by the terminal device 100 through the NUL, and a type (for example, the uplink data 1 or the random access preamble 2) of the sent uplink data is not limited. Therefore, for a specific execution process of step S414, refer to related content of step S406 in the embodiment shown in FIG. 4A and FIG. 4B. Details are not described herein again.

S415: The network device 300 calculates a timing advance TA 4 of the SUL based on the uplink data 2 sent by the terminal device 100.

Similarly, for a specific execution process of step S415, refer to related content of step S407 in the embodiment shown in FIG. 4A and FIG. 4B. Details are not described herein again.

S416: The network device 200 sends the TA query request to the network device 300.

In some embodiments, the network device 200 may periodically send the TA query request to the network device 300.

In some other embodiments, the network device 200 may send the TA query request to the network device 300 after calculating the TA 3 of the NUL (that is, completing performing step S414).

S417: The network device 300 sends the TA 4 of the SUL to the network device 200.

Specifically, after receiving the TA query request sent by the network device 200, the network device 300 may send the TA 4 of the SUL to the network device 200.

In some embodiments, step S416 is optional. The network device 300 may send the TA 4 of the SUL to the network device 200 after completing calculating the TA 4 of the SUL (that is, completing performing step S415). The network device 200 does not need to send the TA query request to the network device 300 in advance.

S418: The network device 200 sends signaling 1 to the terminal device 100, where the signaling 1 carries the TA 3 of the NUL and the TA 4 of the SUL.

In some embodiments, the signaling 1 may include a TAC media access control layer control element (Media Access Control Layer Control Element, MAC CE).

It may be understood that, after receiving the TA 4 of the SUL sent by the network device 300, the network device 200 may send both the TA 3 of the NUL and the TA 4 of the SUL to the terminal device 100.

In some embodiments, the network device 200 may separately send the TA 3 of the NUL or the TA 4 of the SUL. For example, after completing calculating the TA 3 of the NUL and before sending the TA query request to the network device 300, the network device 200 may separately send the TA 3 of the NUL to the terminal device 100. For another example, after sending the TA query request to the network device 300, the network device 200 may separately send the TA 3 of the NUL to the terminal device 100. For still another example, after receiving the TA 4 of the SUL sent by the network device 300, the network device 200 may separately send the TA 3 of the NUL and the TA 4 of the SUL to the terminal device 100.

In an implementation, after step S417, the network device 200 sends signaling 2 to the terminal device 100, and sends signaling 3 to the terminal device 100. The signaling 2 carries the TA 3 of the NUL, and the signaling 3 carries the TA 4 of the SUL. A sending sequence of the signaling 2 and the signaling 3 is not specifically limited herein.

In some other embodiments, the network device 200 may alternatively send the TA 3 of the NUL and a first difference between the TA 4 of the SUL and the TA 3 of the NUL to the terminal device 100.

The following describes four possible design manners of the signaling 1 used when the network device 200 sends the TA 3 of the NUL and/or the TA 4 of the SUL to the terminal device 100.

Design manner 1: As shown in FIG. 6A, the design manner is applicable to a case in which the network device 200 separately sends the TA 3 of the NUL or the TA 4 of the SUL to the terminal device 100.

In the design manner shown in FIG. 6A, the signaling 1 has only one oct, namely, an oct 0, and the oct 0 has eight bits. TAG ID indicates a timing advance group to which the NUL or the SUL belongs, and occupies two bits (that is, the first two bits of the oct 0). A TAC field is used to store the TA 4 of the SUL or the TA 3 of the NUL, and occupies six bits (that is, the last six bits of the oct 0). An index value of a TA corresponding to the field ranges from 0 to 63. When TAG ID is the timing advance group of the NUL, the TAC field stores the TA3 of the NUL. When TAG ID is the timing advance group of the SUL, the TAC field stores the TA 4 of the SUL.

In an implementation, the TA 3 of the NUL and the TA 4 of the SUL share one TAG ID. When the signaling 1 carries related configuration information of the NUL, it indicates that the network device 200 sends the TA 3 of the NUL to the terminal device 100. When the signaling 1 carries related configuration information of the SUL, it indicates that the network device 200 sends the TA 4 of the SUL to the terminal device 100.

Design manner 2: As shown in FIG. 6B, the design manner is applicable to a case in which the network device 200 separately sends the TA 3 of the NUL or the TA 4 of the SUL to the terminal device 100.

In the design manner shown in FIG. 6B, the signaling 1 has only one oct, namely, an oct 0, and the oct 0 has eight bits. TAG ID indicates a timing advance group to which the NUL or the SUL belongs, and occupies two bits (that is, the first two bits of the oct 0). R is a reserved bit, and occupies one bit (that is, a 3rd bit of the oct 0). A TAC field is used to store the TA 3 of the NUL or the TA 4 of the SUL, and occupies six bits (that is, the last six bits of the oct 0). An index value of a TA corresponding to the field ranges from 0 to 32.

The reserved bit R in the signaling 1 in FIG. 6B may be used as an indication bit of SUL TAC or NUL TAC.

In some embodiments, when R is 0, it indicates that the TAC field stores the TA 3 of the NUL, in other words, it indicates that the network device 200 sends the TA 3 of the NUL. When R is 1, it indicates that the TAC field stores the TA 4 of the SUL, in other words, it indicates that the network device 200 sends the TA 4 of the SUL.

Conversely, in some other embodiments, when R is 0, it indicates that the TAC field stores the TA 4 of the SUL, in other words, it indicates that the network device 200 sends the TA 4 of the SUL. When R is 1, it indicates that the TAC field stores the TA 3 of the NUL, in other words, it indicates that the network device 200 sends the TA 3 of the NUL.

Figures 6C, 6D:
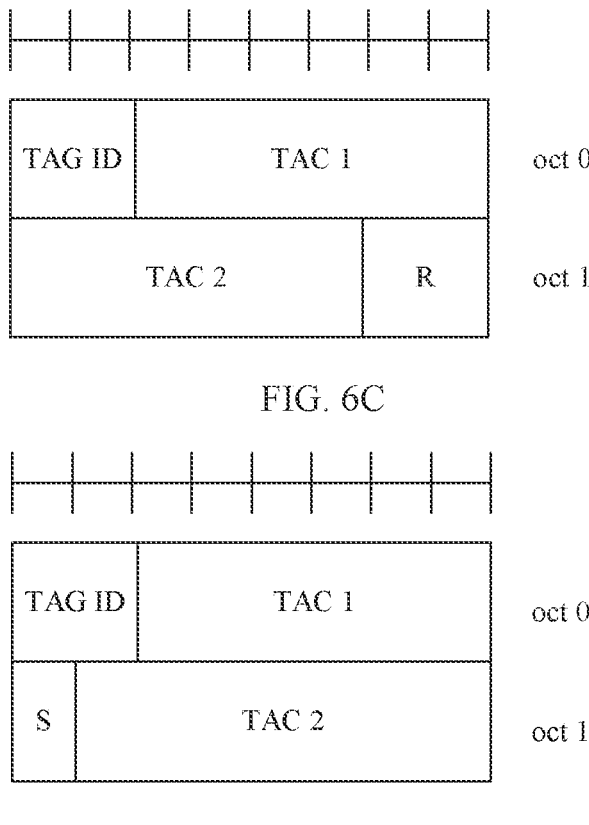

Design manner 3: As shown in FIG. 6C, the design manner is applicable to a case in which the network device 200 simultaneously sends the TA 3 of the NUL and the TA 4 of the SUL to the terminal device 100.

In the design manner shown in FIG. 6C, the signaling 1 has two octs in total, namely, an oct 0 and an oct 1, and each oct has eight bits. TAG ID indicates a timing advance group to which the NUL and the SUL belong, and occupies two bits (that is, the first two bits of the oct 0). A TAC 1 field is used to store the TA 3 of the NUL, and occupies six bits (that is, the last six bits of the oct 0). An index value of a TA corresponding to the field ranges from 0 to 64. A TAC 2 field is used to store the TA 2 of the SUL, and occupies six bits (that is, the first six bits of the oct 1). An index value of a TA corresponding to the field ranges from 0 to 64. R is a reserved bit, and occupies two bits (that is, the last two bits of the oct 1).

In some embodiments, a value of the reserved bit R may indicate whether the TAC 2 field stores the TA 4 of the SUL or the TA 3 of the NUL. For example, when R is 0, it indicates that the TAC 2 field stores the TA 4 of the SUL, and the TAC 1 field stores the TA 3 of the NUL. For another example, when R is 1, it indicates that the TAC 1 field stores the TA 4 of the SUL, and the TAC 2 field stores the TA 3 of the NUL.

In some other embodiments, based on a related protocol standard, that the TAC 2 field stores the TA 4 of the SUL and the TAC 1 field stores the TA 3 of the NUL may be defaulted.

Design manner 4: As shown in FIG. 6D, the design manner is applicable to a case in which the network device 200 simultaneously sends the TA 3 of the NUL and the first difference between the TA 4 of the SUL and the TA 3 of the NUL to the terminal device 100.

In the design manner shown in FIG. 6D, the signaling 1 has two octs in total, namely, an oct 0 and an oct 1, and each oct has eight bits. TAG ID indicates a timing advance group to which the NUL and the SUL belong, and occupies two bits (that is, the first two bits of the oct 0). A TAC 1 field is used to store the TA 3 of the NUL, and occupies six bits (that is, the last six bits of the oct 0). An index value of a TA corresponding to the field ranges from 0 to 64. S is a sign bit, and occupies one bit (that is, a $1^1$ bit of the oct 1). A TAC 2 field is used to store a difference between the TA 4 of the SUL and the TA 3 of the NUL, and occupies seven bits (that is, the last seven bits of the oct 1). An index value of a TA corresponding to the field ranges from 0 to 128. The sign bit S indicates whether a value stored in the TAC 2 field is positive or negative.

In some embodiments, based on a related protocol standard, that the TAC 1 field stores the TA 3 of the NUL and the TAC 2 field stores the first difference between the TA 4 of the SUL and the TA 3 of the NUL may be defaulted.

It may be understood that the TA 4 of the SUL is a sum of a value (the first difference between the TA 4 of the SUL and the TA 3 of the NUL) stored in the TAC 2 field and a value (the TA 3 of the NUL) stored in the TAC 1 field.

It should be noted that the design manner of the signaling 1 includes but is not limited to the foregoing four design manners. This is not limited in this embodiment of this application.

S419: The terminal device 100 adjusts, based on the TA 3 of the NUL, time for sending uplink data through the NUL, and adjusts, based on the TA 4 of the SUL, time for sending uplink data through the SUL.

In the connection phase, time at which the uplink data sent by the terminal device 100 arrives at the network device may change due to some factors. For example, a data transmission delay between the terminal device 100 in motion (for example, the terminal device 100 on a high-speed train in motion) and the network device 200 may change continuously. A Doppler frequency shift that may be caused by movement of the terminal device 100 also affects the data transmission delay between the terminal device 100 and the network device. In addition, accumulation of crystal oscillator offsets of the terminal device 100 for a long time may cause an uplink timing error. Therefore, the terminal device 100 needs to continuously update an uplink timing advance of the terminal device 100, to maintain uplink synchronization.

For the NUL, after receiving the TA 3 of the NUL sent by the network device 200, the terminal device 100 may adjust, based on the TA 3 of the NUL, the time for sending uplink data through the NUL.

For the SUL, in some embodiments, after receiving the TA 4 of the SUL sent by the network device 200, the terminal device 100 may adjust, based on the TA 4 of the SUL, the time for sending uplink data through the SUL. In some other embodiments, the terminal device 100 may alternatively calculate the TA 4 of the SUL after receiving the TA 3 of the NUL and the difference between the TA 4 of the SUL and the TA 3 of the NUL that are sent by the network device 200, and then adjust, based on the TA 4 of the SUL, the time for sending uplink data through the SUL.

In the connection phase, that the terminal device 100 adjusts, based on a TA, the time for sending the uplink data specifically includes. Relative to current time for sending the uplink data, the terminal device 100 calculates, based on the received TA, a value of time that needs to be advanced for sending the uplink data, that is, calculates a size of a time adjustment value $N_{TA, new}$ needed to send the uplink data. A calculation formula of $N_{TA, new}$ is as follows: $N_{TA, new} = N_{TA, old} + (TA - 31) \times 16$ (unit: Ts), where $N_{TA, old}$ is a time adjustment value that is obtained by the terminal device 100 through latest calculation and that is for sending the uplink data, and the TA is a timing advance that is sent by the network device 200 and that is received by the terminal device 100 currently.

In an implementation, for the NUL, $N_{TA\ 3, new} = N_{TA\ 3, old} + (TA\ 3 - 31) \times 16$ Ts, and for the SUL, $N_{TA\ 4, new} = N_{TA\ 4, old} + (TA\ 4 - 31) \times 16$ Ts.

In some embodiments, the network device 200 or the network device 300 may calculate the TA after receiving the uplink data sent by the terminal device 100, and then send the TA obtained through calculation to the terminal device 100 via the network device 200. In some embodiments, the network device 200 or the network device 300 may periodically calculate the TA, and then send the TA obtained through calculation to the terminal device 100 via the network device 200.

In some other embodiments, the network device 200 may alternatively configure a timer for the terminal device 100 by using radio resource control layer (Radio Resource Control Layer, RRC) signaling. The timer is used to determine whether the terminal device needs to update the timing advance. When receiving the TAC sent by the network device 200, the terminal device 100 starts (when the terminal device 100 receives the TAC sent by the network device 200 for the first time) or restart (when it is not the first time that the terminal device 100 receives the TAC sent by the network device 200) the timer. When the timer runs, it indicates that the terminal device 100 is in uplink synchronization and does not need to update the timing advance. When the timer stops running (expires), it indicates that the terminal device 100 is out of uplink synchronization and needs to update the timing advance. In this case, the terminal device 100 may send the random access preamble to the network device 200 or the network device 30) to re-initiate random access. Generally, the network device 200 sends a new timing advance to the terminal device 100 before the timer expires, to ensure that the terminal device 100 keeps the uplink synchronization. Because sending the TA of the SUL by the network device 300 to the network device 200 needs a specific transmission delay, running duration of a timer of the SUL is usually set to be longer than running duration of a timer of the NUL.

The non-co-site deployment scenario is used as an example. Embodiments of this application provide another uplink synchronization method. In an initial access phase, a terminal device 100 may determine a random access preamble 1 and a random access preamble 2 based on a broadcast message of a network device 200, and initiates random access through an uplink 1. Then, the network device 200 may trigger, by using a physical downlink control channel order (Physical Downlink Control Channel Order, PDCCH Order), the terminal device 100 to initiate random access through an uplink 2. A network device 30) may calculate a TA of an SUL based on the random access preamble 1, and the network device 200 may calculate a TA of an NUL based on the random access preamble 2. Then, the terminal device 100 may adjust, based on the TA of the SUL, time for sending uplink data through the SUL, and adjust, based on the TA of the NUL, time for sending uplink data through the NUL. In a connection phase, the terminal device 100 may also continuously adjust, based on the TA of the SUL, the time for sending uplink data through the SUL, and adjust, based on the TA of the NUL, the time for sending uplink data through the NUL. The uplink 1 is the NUL, and the uplink 2 is the SUL. Alternatively, the uplink 1 is the SUL, and the uplink 2 is the NUL. When embodiments of this application are implemented, the terminal device can be enabled to separately adjust the time for sending uplink data through the NUL and the time for sending uplink data through the SUL, to optimize transmission performance of the SUL and improve user experience.

Figure 7A:
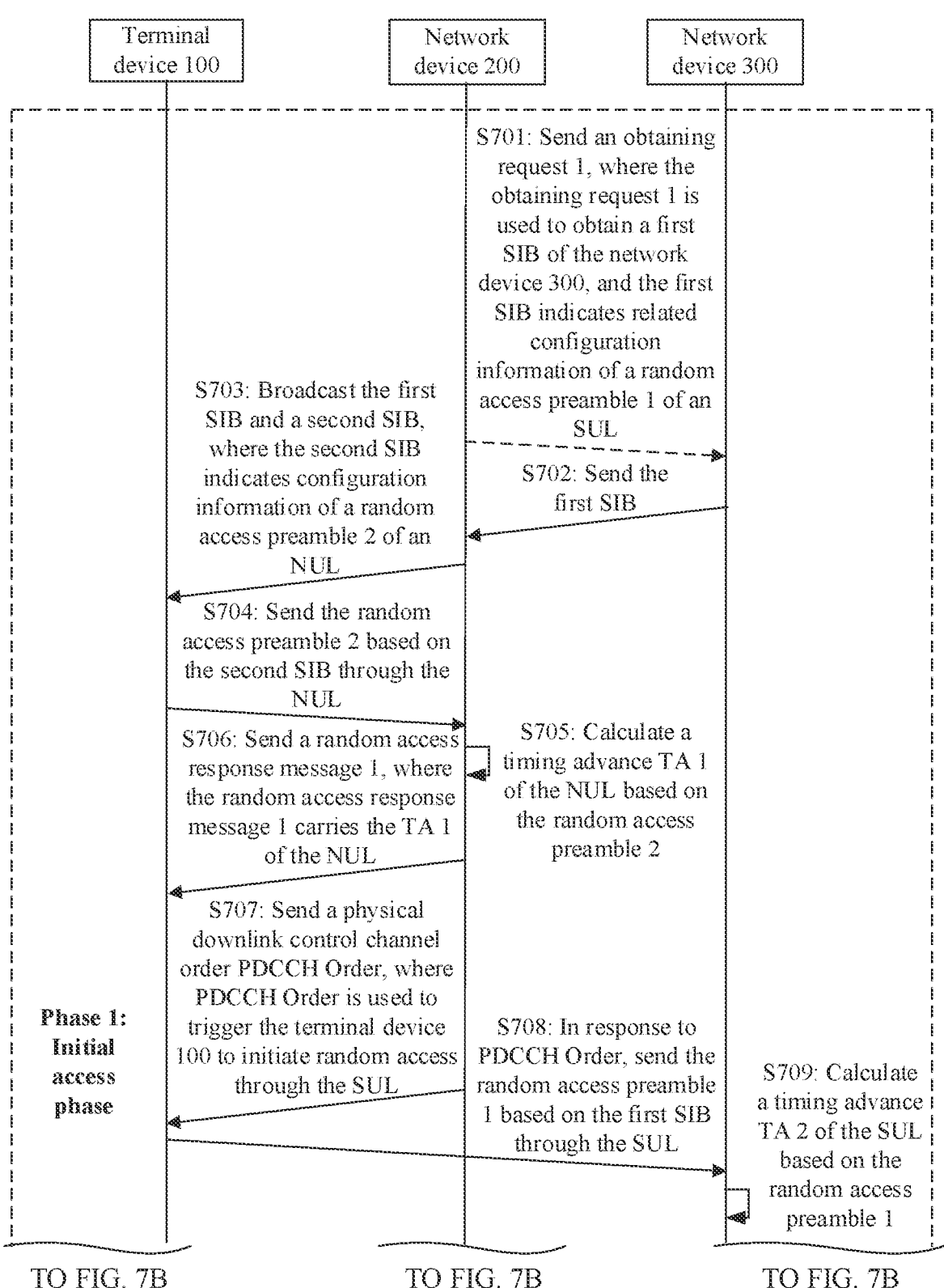
FIG. 7A and FIG. 7B are a schematic flowchart of another uplink synchronization method according to an embodiment of this application.
Figure 7B:
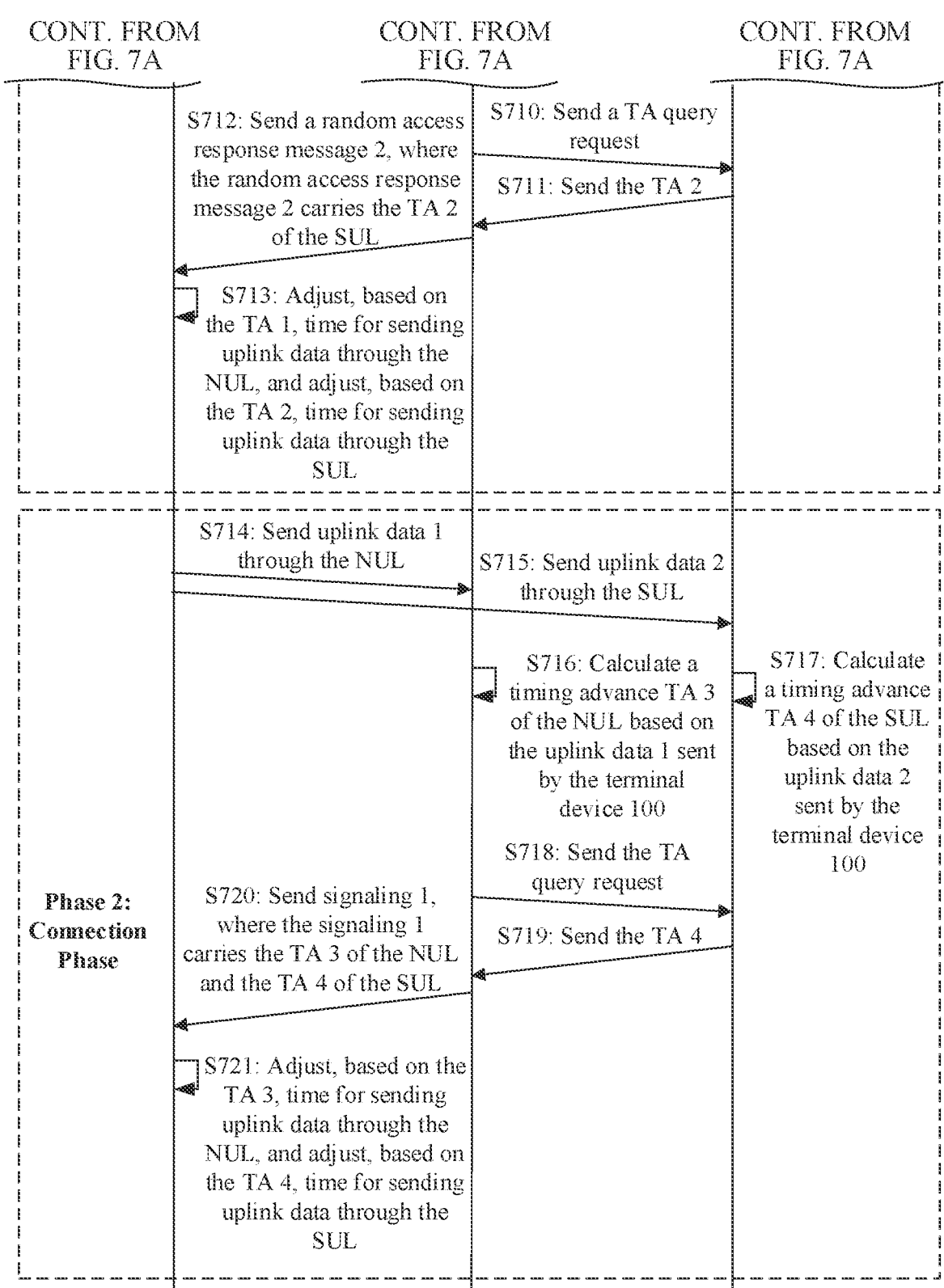

The following uses an example in which the uplink link 1 is the NUL to describe a method procedure of the foregoing uplink synchronization method in detail. FIG. 7A and FIG. 7B show an example of a method procedure of another uplink synchronization method according to an embodiment of this application.

As shown in FIG. 7A and FIG. 7B, the method may be applied to a communication system that includes a terminal device 100, a network device 200, and a network device 300. The network device 200 may provide an NUL service and an NDL service for the terminal device 100, and the network device 300 may provide the SUL service for the terminal device 100. Specific steps of the method are described in detail below.

Phase 1: Initial Access Phase

S701: The network device 200 sends an obtaining request 1 to the network device 300, where the obtaining request 1 is used to obtain a first SIB of the network device 300, and the first SIB indicates configuration information of a random access preamble 1 of the SUL.

S702: After receiving the obtaining request 1 sent by the network device 200, the network device 300 sends the first SIB to the network device 200.

S703: The network device 200 broadcasts the first SIB and a second SIB, where the second SIB indicates configuration information of a random access preamble 2 of the NUL.

S704: The terminal device 100 sends the random access preamble 2 to the network device 200 based on the second SIB through the NUL.

For specific execution processes of step S701 to step S704, refer to related content of step S401 to step S404 in the embodiment shown in FIG. 4A and FIG. 4B. Details are not described herein again.

S705: The network device 200 calculates a timing advance TA 1 of the NUL based on the random access preamble 2.

For a specific execution process of step S705, refer to related content of step S406 in the embodiment shown in FIG. 4A and FIG. 4B. Details are not described herein again.

S706: The network device 200 sends a random access response message 1 to the terminal device 100, where the random access response message 1 carries the TA 1 of the NUL.

Specifically, after completing calculating the TA 1 of the NUL, the network device 200 may send the random access response message 1 to the terminal device 100. A design manner of signaling of the random access response message 1 may be the design manner of the RAR signaling in FIG. 5A. For specific content, refer to the text descriptions of FIG. 5A. Details are not described herein again.

S707: The network device 200 sends a physical downlink control channel order PDCCH Order to the terminal device 100, where PDCCH Order is used to trigger the terminal device 100 to initiate random access through the SUL.

Specifically, the network device 200 sends PDCCH Order to the terminal device 100. After receiving PDCCH Order, the terminal device 100 may initiate random access to the network device 300 through the SUL, that is, perform the following step S708.

In some embodiments, step S707 may be performed in any time period between step S704 and step S706. For example, step S707 may be performed before step S705. For another example, step S707 may be performed before step S706. A time sequence of performing step S707 is not limited in this embodiment of this application.

S708: In response to PDCCH Order, the terminal device 100 sends the random access preamble 1 to the network device 300 based on the second SIB through the SUL.

For a specific execution process of step S708, refer to related content of step S405 in the embodiment shown in FIG. 4A and FIG. 4B. Details are not described herein again.

In some embodiments, in step S703, the network device 200 further broadcasts a deployment identifier and/or a multi-TA identifier. The deployment identifier indicates that the network device 200 and the network device 300 are in non-co-site deployment, and the multi-TA identifier indicates that a TA of the NUL and a TA of the SUL are independently maintained. Based on the deployment identifier and/or the multi-TA identifier, the terminal device 100 determines to send the random access preamble 2 to the network device 200 through the NUL in step S704, and trigger, by using PDCCH Order, the terminal device 100 to initiate random access through the SUL in step S707.

It may be understood that, in some embodiments, when the terminal device 100 receives the deployment identifier and/or the multi-TA identifier broadcast by the network device 200, the terminal device 100 determines to independently maintain the TA of the NUL and the TA of the SUL. The terminal device 100 sends the random access preamble 2 and the random access preamble 1 through the NUL and the SUL respectively. When the terminal device 100 does not receive the deployment identifier and/or the multi-TA identifier broadcast by the network device 200, the terminal device 100 determines to use a conventional TA maintenance solution, that is, the NUL and the SUL share a same TA.

The foregoing step S704 to step S708 describe a process in which the terminal device 100 first initiates random access on the NUL, and then the network device 200 triggers, by sending the PDCCH Order, the terminal device 100 to initiate random access on the SUL. In some embodiments, the terminal device 100 may alternatively first initiate random access through the SUL, and then the network device 200 triggers, by sending PDCCH Order, the terminal device 100 to initiate random access through the NUL.

S709: The network device 300 calculates a timing advance TA 2 of the SUL based on the random access preamble 1.

S710: The network device 200 sends a TA query request to the network device 300.

S711: The network device 300 sends the TA 2 of the SUL to the network device 200.

For specific execution processes of step S709 to step S711, refer to related content of step S407 to step S409 in the embodiment shown in FIG. 4A and FIG. 4B. Details are not described herein again.

S712: The network device 200 sends a random access response message 2 to the terminal device 100, where the random access response message 2 carries the TA 2 of the SUL.

Specifically, after receiving the TA 2 of the SUL sent by the network device 300, the network device 200 may send the random access response message 2 to the terminal device 100. A design manner of signaling of the random access response message 2 may be the design manner of the RAR signaling in FIG. 5A. For specific content, refer to the text descriptions of FIG. 5A. Details are not described herein again.

In some embodiments, the random access response message 2 may further carry the TA 1 of the NUL and a first difference between the TA 2 of the SUL and the TA 1 of the NUL. The design manner of the signaling of the random access message 2 may be the design manner of the RAR signaling in FIG. 5C. For specific content, refer to the text description of FIG. 5C. Details are not described herein again.

S713: The terminal device 100 adjusts, based on the TA 1 of the NUL, time for sending uplink data through the NUL, and adjusts, based on the TA 2 of the SUL, time for sending uplink data through the SUL.

For a specific execution process of step S713, refer to related content of step S411 in the embodiment shown in FIG. 4A and FIG. 4B. Details are not described herein again.

Phase 2: Connection Phase

S714: The terminal device 100 sends uplink data 1 through the NUL.

S715: The terminal device 100 sends uplink data 2 through the SUL.

S716: The network device 200 calculates a timing advance TA 3 of the NUL based on the uplink data 1 sent by the terminal device 100.

S717: The network device 300 calculates a timing advance TA 4 of the SUL based on the uplink data 2 sent by the terminal device 100.

S718: The network device 200 sends a TA query request to the network device 300.

S719: The network device 300 sends the TA 4 of the SUL to the network device 200.

S720: The network device 200 sends signaling 1, for example, TAC MAC CE, to the terminal device 100, where the signaling 1 carries the TA 3 of the NUL and the TA 4 of the SUL.

S721: The terminal device 100 adjusts, based on the TA 3 of the NUL, time for sending uplink data through the NUL, and adjusts, based on the TA 4 of the SUL, time for sending uplink data through the SUL.

For specific execution processes of step S714 to step S721, refer to related content of step S412 to step S419 in the embodiment shown in FIG. 4A and FIG. 4B. Details are not described herein again.

In an implementation, after step S719, the network device 200 sends signaling 2 to the terminal device 100, and sends signaling 3 to the terminal device 100. The signaling 2 carries the TA 3 of the NUL, and the signaling 3 carries the TA 4 of the SUL. A sending sequence of the signaling 2 and the signaling 3 is not specifically limited herein.

It should be noted that the terminal device 100 may determine the random access preamble 1 and the random access preamble 2 based on a broadcast message of the network device 200, and initiate random access through an uplink 1. Then, the network device 200 may trigger, by using PDCCH Order, the terminal device 100 to initiate random access through an uplink 2. When the uplink 1 is the SUL, after receiving the random access preamble 1 sent by the terminal device 100 through the SUL, the network device 300 sends an indication message to the network device 200, to indicate the network device 200 to deliver PDCCH Order to the terminal device 100. For example, after receiving the random access preamble 1, the network device 300 sends the indication message to the network device 200. For another example, after receiving the random access preamble 1, and calculating the timing advance based on the random access preamble 1, the network device 300 sends the indication message to the network device 200. For still another example, after receiving the random access preamble 1, and sending the timing advance to the network device 200, the network device 300 sends the indication message to the network device 200.

In embodiments of this application, the first network device may be the foregoing network device 200, the second network device may be the foregoing network device 300, the first system information may be the foregoing second SIB, the second system information may be the foregoing first SIB, the first identifier may be the foregoing deployment identifier, and the second identifier may be the foregoing multi-TA identifier. In the foregoing initial access phase, the first uplink data and the first random access preamble may be the foregoing random access preamble 2, the second uplink data and the second random access preamble may be the foregoing random access preamble 1, the first downlink signaling may be the foregoing random access response message 1 or the foregoing random access response message 2, the second downlink signaling may be the foregoing random access response message 3, and the third downlink signaling may be the foregoing random access response message 4. In this case, the first timing advance may be the foregoing TA 1, and the second timing advance may be the foregoing TA 2. In the foregoing connection phase, the first uplink data may be the foregoing uplink data 1, the second uplink data may be the foregoing uplink data 2, the first downlink signaling and the first MAC CE may be the foregoing signaling 1, the second downlink signaling and the second MAC CE may be the foregoing signaling 2, and the third downlink signaling and the third MAC CE may be the foregoing signaling 3. In this case, the first timing advance may be the foregoing TA 3, and the second timing advance may be the foregoing TA 4.

The following describes a structure of a terminal device 100 according to an embodiment of this application.

Figure 8:
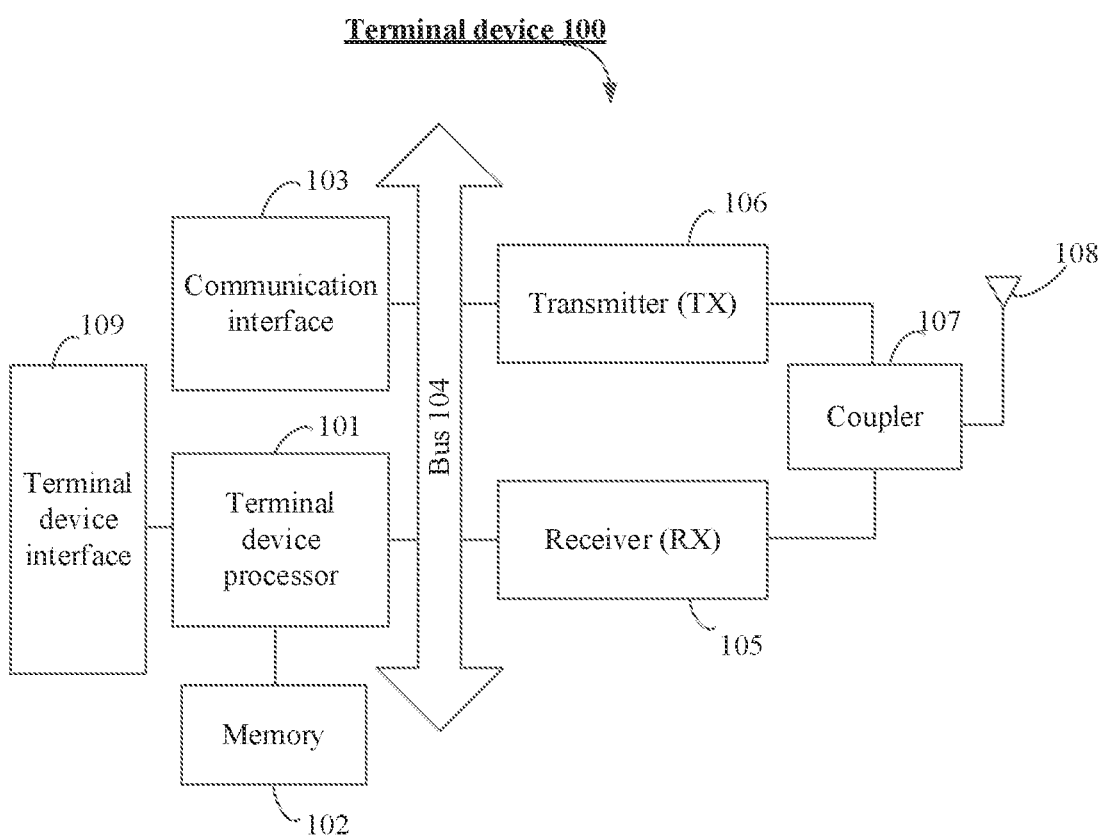
FIG. 8 is a schematic structural diagram of a terminal device according to an embodiment of this application.

FIG. 8 shows an example of the structure of the terminal device 100 according to an embodiment of this application.

As shown in FIG. 8, the terminal device 100 may include one or more terminal device processors 101, a memory 102, a communication interface 103, a receiver 105, a transmitter 106, a coupler 107, an antenna 108, and a terminal device interface 109. These components may be connected through a bus 104 or in another manner. In FIG. 8, an example in which the components are connected through the bus is used.

The communication interface 103 may be used by the terminal device 100 to communicate with another communication device, for example, a network device. Specifically, the network device may be a network device 200 shown in FIG. 9. Specifically, the communication interface 103 may be a 5G communication interface, or may be a communication interface of future new air. In addition to a wireless communication interface, the terminal device 100 may be further configured with a wired communication interface 103, for example, a local access network (local access network. LAN) interface. The transmitter 106 may be configured to transmit a signal output by the terminal device processor 101. The receiver 105 may be configured to receive a mobile communication signal received by the antenna 108.

In some embodiments of this application, the transmitter 106 and the receiver 105 may be considered as a wireless modem. In the terminal device 100, there may be one or more transmitters 106 and receivers 105. The antenna 108 may be configured to convert electromagnetic energy in a transmission line into an electromagnetic wave in free space, or convert an electromagnetic wave in free space into electromagnetic energy in a transmission line. The coupler 107 is configured to divide the mobile communication signal received by the antenna 108 into a plurality of channels of signals and allocate the plurality of signals to a plurality of receivers 105.

In addition to the transmitter 106 and the receiver 105 shown in FIG. 8, the terminal device 100 may further include another communication component, for example, a GPS module, a Bluetooth (Bluetooth) module, or a wireless fidelity (wireless fidelity. Wi-Fi) module. In addition to wireless communication, the terminal device 100 may be further configured with a wired network interface (such as a LAN interface) to support wired communication.

The terminal device 100 may further include an input/output module. The input/output module may be configured to implement interaction between the terminal device 100 and another terminal device or an external environment, and may mainly include an audio input/output module, a key input module, a display, and the like. Specifically, the input/output module may further include a camera, a touchscreen, a sensor, and the like. The input/output module communicates with the terminal device processor 101 through the terminal device interface 109.

The memory 102 is coupled to the terminal device processor 401, and is configured to store various software programs and/or a plurality of groups of instructions. Specifically, the memory 102 may include a high-speed random access memory, and may also include a non-volatile memory, for example, one or more disk storage devices, a flash memory device, or another non-volatile solid-state storage device. The memory 102 may store an operating system (hereinafter referred to as a system), for example, an embedded operating system such as ANDROID, iOS, WINDOWS, or LINUX. The memory 102 may further store a network communication program. The network communication program may be used for communication with one or more additional devices, one or more terminal devices, and one or more network devices.

In some embodiments of this application, the memory 102 may be configured to store an implementation program of the uplink synchronization method provided in one or more embodiments of this application on a terminal device 100 side. For implementation of the uplink synchronization method provided in one or more embodiments of this application, refer to the foregoing embodiments.

The terminal device processor 101 may be configured to read and execute computer-readable instructions. Specifically, the terminal device processor 101 may be configured to: invoke a program stored in the memory 102, for example, the implementation program of the uplink synchronization method provided in one or more embodiments of this application on the terminal device 100 side, and execute instructions included in the program.

It should be noted that the terminal device 100 shown in FIG. 8 is merely an implementation of this embodiment of this application. In actual application, the terminal device 100 may further include more or fewer components. This is not limited herein.

The following describes a structure of a network device 200 according to an embodiment of this application.

Figure 9:
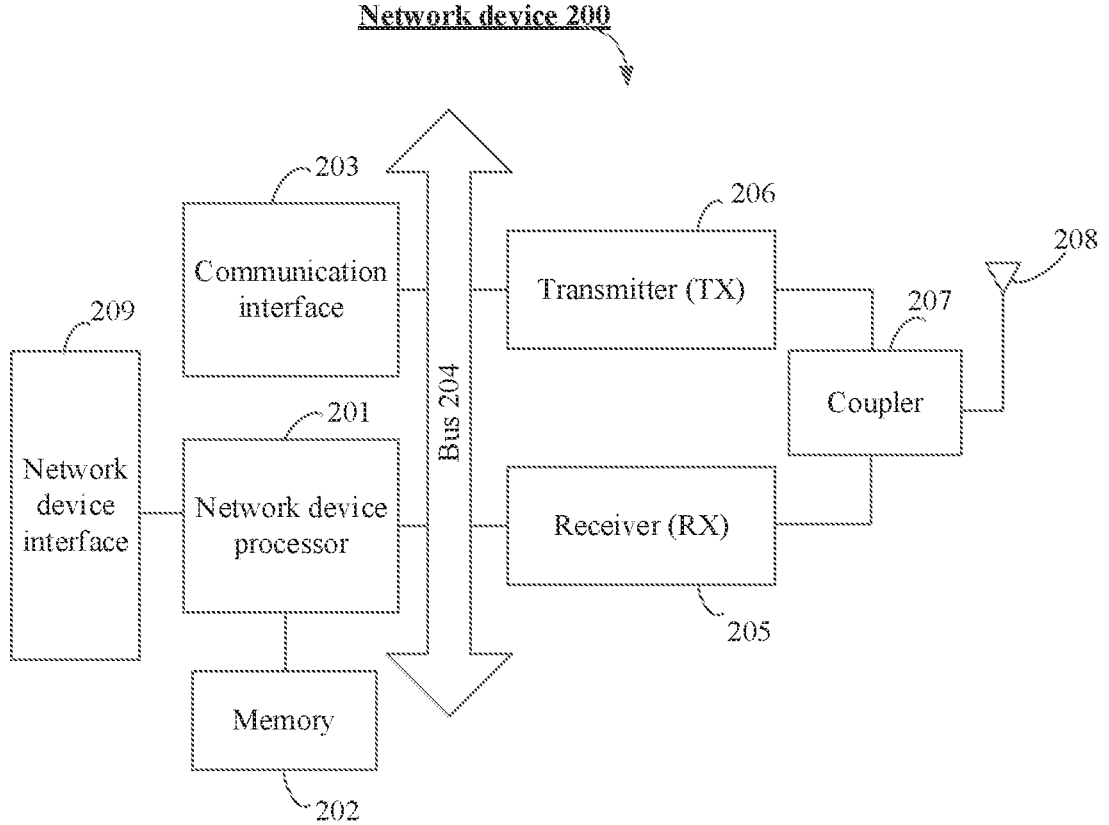
FIG. 9 is a schematic structural diagram of a network device according to an embodiment of this application.

FIG. 9 shows an example of the structure of the network device 200 according to an embodiment of this application.

As shown in FIG. 9, the network device 200 may include one or more network device processors 201, a memory 202, a communication interface 203, a receiver 205, a transmitter 206, a coupler 207, an antenna 208, and a network device interface 209. These components may be connected through a bus 204 or in another manner. In FIG. 9, an example in which the components are connected through bus is used.

The communication interface 203 may be used by the network device 200 to communicate with another communication device, for example, a terminal device. Specifically, the terminal device may be the terminal device 100 shown in FIG. 8. Specifically, the communication interface 203 may be a 5G communication interface, or may be a communication interface of future new air. In addition to a wireless communication interface, the network device 200 may be further configured with a wired communication interface 203, for example, a local access network (local access network, LAN) interface. The transmitter 206 may be configured to transmit a signal output by the network device processor 201. The receiver 205 may be configured to receive a mobile communication signal received by the antenna 208.

In some embodiments of this application, the transmitter 206 and the receiver 205 may be considered as a wireless modem. In the network device 200, there may be one or more transmitters 206 and receivers 205. The antenna 208 may be configured to convert electromagnetic energy in a transmission line into an electromagnetic wave in free space, or convert an electromagnetic wave in free space into electromagnetic energy in a transmission line. The coupler 207 is configured to divide the mobile communication signal received by the antenna 208 into a plurality of channels of signals and allocate the plurality of signals to a plurality of receivers 205.

The memory 202 is coupled to the network device processor 201, and is configured to store various software programs and/or a plurality of groups of instructions. Specifically, the memory 202 may include a high-speed random access memory, and may also include a non-volatile memory, for example, one or more disk storage devices, a flash memory device, or another non-volatile solid-state storage device. The memory 202 may store a network communication program. The network communication program may be used for communication with one or more additional devices, one or more terminal devices, and one or more network devices.

In some embodiments of this application, the memory 202 may be configured to store an implementation program of the uplink synchronization method provided in one or more embodiments of this application on a network device 200 side. For implementation of the uplink synchronization method provided in one or more embodiments of this application, refer to the foregoing embodiments.

The network device processor 201 may be configured to read and execute computer-readable instructions. Specifically, the network device processor 201 may be configured to: invoke a program stored in the memory 202, for example, the implementation program of the uplink synchronization method provided in one or more embodiments of this application on the network device 200 side, and execute instructions included in the program.

It should be noted that the network device 200 shown in FIG. 9 is merely an implementation of this embodiment of this application. In actual application, the network device 200 may further include more or fewer components. This is not limited herein.

A structure of a network device 300 may be the same as the structure of the network device 200. For related content of the structure of the network device 300, refer to related text descriptions of the structure of the network device 200 shown in FIG. 9. Details are not described herein again.

The foregoing embodiments are merely intended for describing the technical solutions of this application, but not for limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of embodiments of this application.

What is claimed is:

1. A method applied to a terminal device and comprising:
   receiving, from a first network device via broadcasting, first system information and second system information;
   generating a first random access preamble based on the first system information;
   generating a second random access preamble based on the second system information;
   sending, to a first network device through a normal uplink (NUL), first uplink data wherein the first uplink data comprises the first random access preamble of the NUL;

sending, to a second network device through a supplementary uplink (SUL), second uplink data, wherein the second uplink data comprises the second random access preamble of the SUL;

receiving, from the first network device, a first timing advance and a second timing advance, wherein the first timing advance is based on the first uplink data, and wherein the second timing advance is based on the second uplink data;

adjusting, based on the first timing advance, a first time for sending the first uplink data through the NUL; and adjusting, based on the second timing advance, a second time for sending the second uplink data through the SUL.

2. The method of claim 1, wherein receiving the first timing advance and the second timing advance comprises receiving first downlink signaling, wherein the first downlink signaling carries the first timing advance and the second timing advance.

3. The method of claim 2, wherein receiving the first timing advance and the second timing advance comprises separately receiving second downlink signaling of the NUL and third downlink signaling of the SUL, wherein the second downlink signaling carries the first timing advance, and wherein the third downlink signaling carries the second timing advance.

4. The method of claim 3, wherein the first downlink signaling comprises a first media access control layer control element (MAC CE), wherein the second downlink signaling comprises a second MAC CE, and wherein the third downlink signaling comprises a third MAC CE.

5. The method of claim 3, wherein
the first downlink signaling comprises first random access response signaling, wherein the second downlink signaling comprises second random access response signaling of the NUL, and wherein the third downlink signaling comprises third random access response signaling of the SUL.

6. The method of claim 1, wherein before generating the first random access preamble and before generating the second random access preamble, the method further comprises:

receiving, from the first network device via broadcast, identification information;

generating the first random access preamble based on the first system information; and generating, after receiving the identification information, the second random access preamble based on the second system information, wherein the identification information is at least one of a first identifier or a second identifier, wherein the first identifier indicates that the first network device and the second network device are in non-co-site deployment, and wherein the second identifier indicates that a timing advance (TA) of the NUL and a TA of the SUL are independently maintained.

7. The method of claim 1, further comprising:

sending the first random access preamble to the first network device through the NUL;

receiving a physical downlink control channel order from the first network device; and sending, through the SUL and based on the physical downlink control channel order, the second random access preamble to the second network device.

8. The method of claim 1, wherein before sending the first uplink data and sending the second uplink data, the method further comprises:

sending, through the SUL, the second random access preamble to the second network device;

receiving a physical downlink control channel order from the first network device, wherein the physical downlink control channel order is indicated by the second network device to be delivered by the first network device; and sending, through the NUL and based on the physical downlink control channel order, the first random access preamble to the first network device.

9. The method of claim 1, wherein the first system information is first system information block (SIB) information of the NUL, and wherein the second system information is second SIB information of the SUL.

10. A method applied to a first network device and comprising:

sending identification information to a terminal device, wherein the identification information comprises at least one of a first identifier or a second identifier, wherein the first identifier indicates that the first network device and a second network device are in non-co-site deployment, and wherein the second identifier indicates that a timing advance (TA) of a normal uplink (NUL) and a TA of a supplementary uplink (SUL) are independently maintained;

receiving, from the terminal device through the NUL, first uplink data wherein the first uplink data comprises a first random access preamble of the NUL;

calculating a first timing advance based on the first uplink data;

receiving, from a second network device, a second timing advance, wherein the second timing advance is based on second uplink data from the terminal device, and wherein the second uplink data comprises a second random access preamble of the SUL; and sending, to the terminal device, the first timing advance to adjust a first time for sending the first uplink data through the NUL and the second timing advance to adjust a second time for sending the second uplink data through the SUL.

11. The method of claim 10, wherein sending the first timing advance and the second timing advance to the terminal device comprises sending, to the terminal device, first downlink signaling, wherein the first downlink signaling carries the first timing advance and the second timing advance.

12. The method of claim 11, wherein sending the first timing advance and the second timing advance to the terminal device comprises separately sending, to the terminal device, second downlink signaling of the NUL and third downlink signaling of the SUL, wherein the second downlink signaling carries the first timing advance, and wherein the third downlink signaling carries the second timing advance.

13. The method of claim 12, wherein the first downlink signaling comprises a first media access control layer control element (MAC CE), wherein the second downlink signaling comprises a second MAC CE, and wherein the third downlink signaling comprises a third MAC CE.

14. The method of claim 12, wherein before receiving the first uplink data, the method further comprises:

obtaining, from the second network device, second system information; and sending, to the terminal device, first system information to generate the first random access preamble and the second system information to generate the second random access preamble.

15. The method of claim 12, wherein the first downlink signaling comprises first random access response signaling, wherein the second downlink signaling comprises second random access response signaling of the NUL, and wherein the third downlink signaling comprises third random access response signaling of the SUL.

16. The method of claim 14, wherein the first system information is first system information block (SIB) information of the NUL, and wherein the second system information is second SIB information of the SUL.

17. The method of claim 10, wherein after receiving the first uplink data, the method further comprises sending a physical downlink control channel order to the terminal device, wherein the physical downlink control channel order instructs the terminal device to send the second random access preamble to the second network device through the SUL.

18. The method of claim 10, wherein before receiving the first uplink data, the method further comprises:

receiving, from the second network device, an indication message; and sending, to the terminal device, a physical downlink control channel order based on the indication message, wherein the physical downlink control channel order instructs the terminal device to send the first random access preamble to the first network device through the NUL.

19. The method of claim 10, wherein before sending the first timing advance and the second timing advance to the terminal device, the method further comprises:

sending, to the second network device, a timing advance query request instructing the second network device to send the second timing advance to the first network device; and receiving or periodically receiving, from the second network device, the second timing advance.

20. An uplink synchronization method applied to a second network device, the method comprising:

sending second system information to a first network device;

receiving, from a terminal device through a supplementary uplink (SUL), second uplink data, wherein the second uplink data comprises a second random access preamble of the SUL, and wherein the second random access preamble is generated by the terminal device based on the second system information;

calculating a second timing advance based on the second uplink data;

sending, to a first network device, the second timing advance to adjust a time for sending uplink data through the SUL; and receiving, from the terminal device, third uplink data through the SUL based on the second timing advance.

* * * * *